(12) United States Patent
Martindale et al.

(10) Patent No.: US 8,327,947 B2
(45) Date of Patent: Dec. 11, 2012

(54) VERTICAL TINE TILLAGE TANDEM FRAME AND INTER-RELATED SECONDARY TILLAGE, PLANTING AND FERTILIZING MACHINE

(76) Inventors: James R. Martindale, Spencerville, IN (US); Daniel R. Martindale, Spencerville, IN (US)

( * ) Notice: Subject to any disclaimer, the term of this patent is extended or adjusted under 35 U.S.C. 154(b) by 0 days.

(21) Appl. No.: 12/979,040

(22) Filed: Dec. 27, 2010

(65) Prior Publication Data
US 2011/0155401 A1    Jun. 30, 2011

Related U.S. Application Data

(60) Provisional application No. 61/291,533, filed on Dec. 31, 2009.

(51) Int. Cl.
*A01B 5/00* (2006.01)
(52) U.S. Cl. .......................... 172/146; 172/126
(58) Field of Classification Search ............ 172/21, 172/22, 55–58, 121–123, 126, 540, 554, 172/548–550, 133, 178, 175, 177, 180, 181, 172/195, 196, 142–156
See application file for complete search history.

(56) References Cited

U.S. PATENT DOCUMENTS

| | | | |
|---|---|---|---|
| 1,611,358 A * | 12/1926 | Miller | 172/594 |
| 4,361,191 A * | 11/1982 | Landoll et al. | 172/146 |
| 4,383,580 A | 5/1983 | Huxford | |
| 4,840,232 A | 6/1989 | Mayer | |
| 5,622,227 A * | 4/1997 | McDonald | 172/146 |
| 6,554,078 B1 * | 4/2003 | McDonald | 172/69 |
| 6,666,280 B1 * | 12/2003 | Wright et al. | 172/178 |
| 6,854,525 B2 | 2/2005 | Martindale | |
| 7,017,675 B2 * | 3/2006 | Ankenman et al. | 172/146 |
| 7,172,032 B2 * | 2/2007 | McKinley et al. | 172/21 |
| 2005/0077060 A1 | 4/2005 | McKinley et al. | |
| 2008/0053671 A1 | 3/2008 | Buckrell et al. | |

OTHER PUBLICATIONS

SAF-Holland Equipment Limited, Advanced Aeration Systems brochure, 8 pages.

* cited by examiner

*Primary Examiner* — Robert Pezzuto
(74) *Attorney, Agent, or Firm* — George Pappas

(57) ABSTRACT

A tillage machine includes a plurality of front tines and a plurality of rear tines rotatably secured to a frame which is pulled by a tractor in a direction of travel. The front tines are aligned with the rear tines along the direction of travel whereby the front tines penetrate the soil and create tine soil penetrations, and the rear tines enter the soil in the penetrations created by the front tines. Preferably, the front tines are also rotatably secured to the frame in a clockwise or counterclockwise angle about a front pivot point. The rear tines are rotatably secured to the frame in a clockwise of counterclockwise angle about a rear pivot point opposite the front tines angle. The front tines penetrate and fracture the soil in one direction and the rear tines enter the soil penetrations created by the front tines and fracture the soil in another direction.

40 Claims, 22 Drawing Sheets

Figure 1:
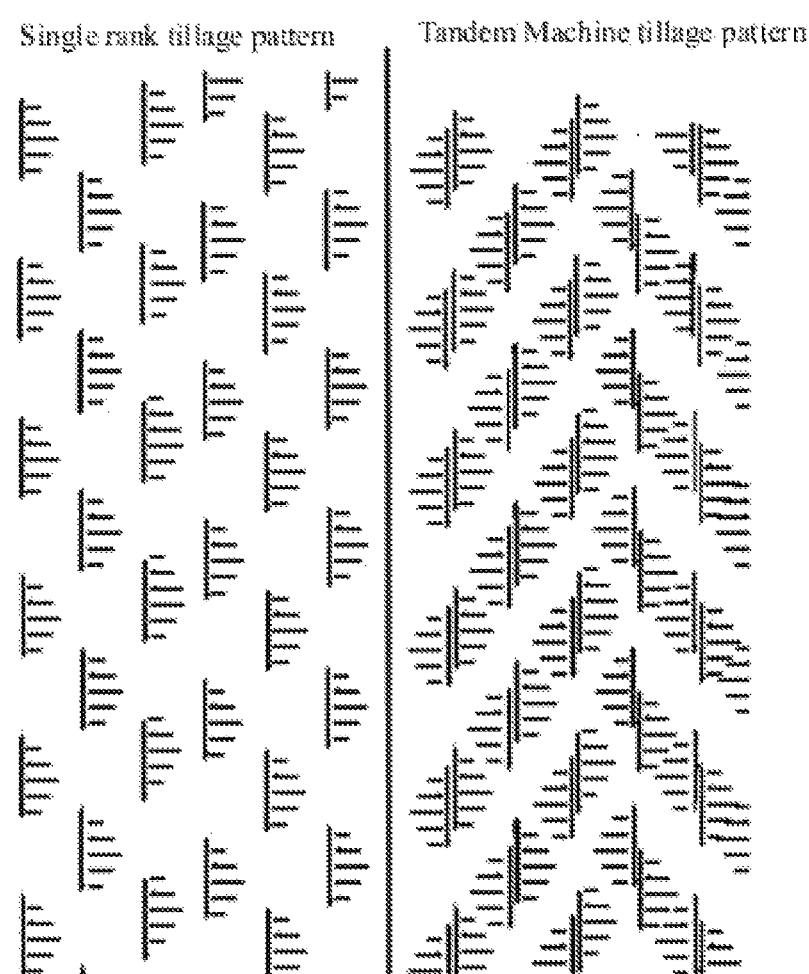

VERTICAL TINE TILLAGE TANDEM FRAME AND INTER-RELATED SECONDARY TILLAGE, PLANTING AND FERTILIZING MACHINE

This application claims priority under provisional application No. 61/291,533 filed Dec. 31, 2009

INTRODUCTION

The description of this tillage tool invention discloses several different arrangements of framing members and associated components attached thereto which selectively reduce soil bulk density while significantly reducing soil erosion potential by eliminating vertical mixing of soil and simultaneous root mass dislocation. This disclosure incorporates by reference Huxford (1983) soil aerator tine geometry. The additional tine enhancements disclosed herein are not contained in Martindale (2005) U.S. Pat. No. 6,854,525 and Canadian Patent #2,409,097. Achieving the unique features of vertical tillage claimed by the tandem frame design have required new and unique features be disclosed in this application. The tandem roller frame design requires several unique alterations to the Huxford (1983) tine for optimal performance to achieve the tillage, crop residue management and seeding capabilities.

The tillage machine disclosed permits an infinite range of tillage actions and tine alignment configurations to achieve a wide range of tillage and cultivation functions. Examples of attachments to the frame of this invention disclosed include choppers as one type residue resizing apparatus and rotary harrows. Rotary harrows when properly adjusted achieve unique benefits ranging from gentle cultivation of growing crops to residue resizing and thorough soil stirring without vertical mixing to depths up to three inches (7.5 cm). The secondary tillage action is performed following the primary tillage tine operation to the full depth of the plow-layer or about nine (9) inches (22.5 cm). The amount of fracturing performed by the vertical primary tillage tine has a profound impact on the performance of the rotary harrow and other secondary tillage and planting attachments.

The invention disclosed achieves the goal of rapid disappearance of water from the soil surface and efficient water transport and air exchange within the topsoil without destruction of the fragile eco-system which is so needful of productive agricultural soils. The merging of several types of tillage and planting technologies in the Vertical Tine Tillage Tandem Frame and Inter-related Secondary Tillage, Planting and Fertilizing Machine will increase agricultural soil health and sustainability of agricultural productivity.

BACKGROUND

Field of the Invention

Tillage practices world wide have undergone significant changes during the decades following the 1960's when moldboard plowing and other extreme soil inverting tools were commonplace. Significant progress in planting equipment has ushered in a host of new tillage concept tools many of which are now termed soil aerators and "vertical tillage" machines. Many of these machines do not address soil structural difficulties due to weathering influences such as water transport through the soil or traffic compaction forces because they are unable to achieve a sufficient operating depth. That depth is normally identified as the plow-layer or 7 inches (17.5 cm) to 9 inches (22.5 cm) deep where these problems primarily exist.

The machine disclosed here disrupts compacted soils according to a regular pre-determined pattern which is effective at restoring water and air exchange throughout the entire plow-layer. No zones of compacted soil in the top 22.5 cm or 9 inches remain which will restrict rapid water and air exchange or normal root development.

Vertical tillage technology, known also as soil aerators, has been plagued by requirements for high amounts of weight in framing components and ballasting. This requirement has been met by including large amounts of structural steel in the framing of the machine or by adding ballasting materials such as water or concrete to the machine frame. In any of these scenarios the need to add pounds to the tine to achieve entry and complete penetration has required use of more expensive bearings and additional framing materials in order to transmit the force required during field operations. The increased weight has aggravated tine, roller, tine retaining bolt, bearing and frame failures.

Transport of the machines is complicated because the transport wheels, axles and bearings must be sized to safely transport these large loads required for penetration in the field. The situation is even more aggravated in the case of folding models. Some machines require sophisticated weight trays and brackets in order to secure the ballast to wings, which fold vertically. The increased sizing and expense of the hydraulic components required to control these wings adds considerably to the cost of this technology. Large wing loads raised high above the transport system has produced dangerous highway accident potential. One of the primary reasons for high weight requirements is because of the number of tine entry events which occur at any single moment in time across the machine width and the commensurate point pressure needed to obtain complete tine penetration into the soil.

Existing soil aerator technology has been limited in the amount of fracture force it can create by the amount of weight that can be amassed economically to force the tillage tines into the soil in a single pass. Operator guidelines in the case of the Mayer (1988) art suggest making two passes over a field in opposite or perpendicular directions to achieve more tillage. In excessively hard soil conditions due to vehicular traffic or by virtue of the nature of the soils themselves, multiple passes have been required to obtain sufficient amounts of loosened soil in order to facilitate planter or seeder operation. Additionally, more tillage is often required in order to obtain adequate root mass development. This is especially true when establishing a new crop with a bare soil condition. Additional field passes quite literally have doubled or tripled the cost of operation of this technology in the past.

Attempts to create more total soil tillage have resulted in designs which are not suitable for aeration procedures in hay crop forages or other perennial living cultivars. These inventions achieve more tillage by misalignment of two tandem-mounted rotating tine assemblies. Two roller assemblies are mounted integrally on the same swingarm assembly to force the rear gang tines to till between the initial rows of perforations. (Holland Equipment LTD, Canada calls this a close-coupled tandem version). This arrangement serves to increase the ballasting requirement for the total machine as well as double the number of soil perforations. There is also much greater potential for erosion by dislodging more root mass from the plow layer. This arrangement hinders soil surface conformity during operation especially at greater roller offset angles which are required to produce more loosened soil. In these situations the tillage is too destructive for stimulating existing root systems; instead roots are destroyed. The same problem exists when attempting to operate in young row-crops such as corn, wheat and grain sorghum as a cultivator. The farmer is faced with having to own two different machines or one must disassemble components to make this close-coupled tandem configuration suitable for the full range of applications.

Mayer (1988) argued that the tine alterations on the Huxford (1983) tine achieved the goals of aeration without surface disturbance plus he could overturn soil when adjusted to a greater angle of offset to the perpendicular to travel direction. This latter characteristic was achieved and created zones of vertical compaction.

The surface produced by these configurations are still too inhospitable for planting and harvesting machines without using additional secondary tillage. Secondary tillage tools used in conjunction with these other presentations of the tine-type soil aerator are engaged in primarily resizing and redistributing soil which has been moved upward from within the plow-layer to the field surface (Mayer 1988). The secondary tillage has, in fact, been employed to refill the depressions or holes made by the aggressive action of the aerator tines. The situation presents to the end user no difference in net effect from other conventional tillage machines with regards to promoting soil health.

In distinct contrast to the situation described above consider the innovative vertical tillage tool called the rotary harrow. It has historically been used to till only enough (1 inch (2.5 cm) or less to be able to lift plant residues from wet soil surfaces to allow air to dry the field surface enough to be able to plant without mud accumulating on the planter parts. The rotary harrow when operated in conjunction with the tandem frame design vertical tillage tine disclosed here, can cultivate shallow weeds in growing wheat, corn and alfalfa crops. It can also produce a homogenous seedbed up to three inches (7.5 cm) deep in a single pass or any other desired depth with or without vertical vaulting of root systems to the field surface.

One of the most serious limitations of the tine type aeration tools offered in the marketplace to date has been the inability of the operator to consistently and reliably replace soil engaging tines to maintain optimal performance. Optimal performance is primarily determined by the depth of penetration of the soil engaging tine device. That is obviously, in part, a function of tine length.

Diagnosis of the soil condition to determine the correct minimal depth of penetration or tine length, required to make the operation effective is quite sophisticated. It can require competent use of a soil penetrometer or other even more sophisticated measurement devices not readily available on the farm or other work site. The lack of sophistication in machine design and the lack of sophistication in diagnostic skills by operators have produced variable results in the field. Owners of this technology who have failed to make the maintenance expenditures for tine replacement in a timely manner have not achieved the benefits which this technology provides when the tine length is properly maintained. Other operators have needlessly replaced tines that were long enough to be effective. More marginal soils, which are often used as grazing lands or for the production of hay crop forages are often troublesome because of the presence of field stones or rocks. If these rocks are displaced to the field surface, then mowing and other harvesting operations are nearly impossible except at great expense. These troublesome soils are some of the potentially most productive soils in use today and need to continue to be into the future. Previous and present renderings of this tine-type technology have placed approximately 69,000 perforations per square acre or over 170,000 per hactare. This number of insertions by simple probability disturbs more root systems and finds more rocks in routine operation than a design which produces fewer perforations. This prior art of the technology has not been user friendly in these less than ideal soil conditions to the present time. Single rank renderings of the aerator requiring greater angles roller offset only further aggravate the rock problem.

No provisions are presently available in this tillage technology to protect soil engaging tines, associated bearings and suspension system components when an immoveable object is struck. This invention discloses a trip mechanism which is adjustable while the machine is underway to provide rock protection.

Lastly, existing soil aerator machines do not permit adjustability of the tine tillage aggressiveness while the machine is underway or performing soil tillage. Adjustability has historically been a constant compromise from one soil type or field condition to another, even from one end of a field to the other. Many agricultural field situations present as many as two to three different soil conditions and/or soil types in a single trip through the length of a field. In certain moisture, crop conditions and soil types it is advisable to change tine aggressiveness much more often than is practical with existing technology.

The Vertical Tillage Tine for the Tandem Frame

The original tine-type New Zealand registration (Huxford-1983) was uniquely effective because it presented a flat rolling surface to the soil surface. The unique benefits to this welded assembly included 1.) Accentuated soil fracturing forces
2.) Minimal soil lifting between tine insertion locations and
3.) Very little soil adhesion to the tine surface.

All of these design advances have been lacking since the disappearance of the welded assemblies disclosed by Huxford (83).

Efforts to provide for individual tine replacement have involved removing remnants of weldments and tines (Huxford-1983), or has required loosening a group of tines located between clamping rings to remove and replace a single broken tine (Mayer 1987). Defying the reality of broken tines in many agricultural soils, McKinley (2003 application) has proposed a three-tine single form casting making it impossible to replace individual tines altogether.

Martindale (2005) preserved the original geometry necessary for basic tine performance characteristics and improved strength and longevity. These design features create a tillage tine which is too aggressive for the tandem design.

The embodiments disclosed herein include the following:
1.) A roller assembly with clockwise and counterclockwise uniform helixes
2.) No welds
3.) No small fasteners to retain tines
4.) A roller circumference which engages the soil surface to prevent soil lifting during the compression of the soil by the tine thrust face between adjacent tines.

All or most of these features are absent from existing tine-type soil aeration technology. Where any of these features do exist, there are designs deficiencies associated with them which render the systems for presenting the soil engaging tines to the soil, nearly impossible to keep tight and intact or expensive to maintain in the event tines are broken during operation. This disclosure and the various embodiments, remedy all of these deficiencies.

The embodiments disclosed enable the operator of tine-type soil aerator technology to replace individual tines, locate and service bearings at the ends or intermediate locations along the length of the supporting shafts or arbors, and restore all the soil fracturing abilities of the Huxford 1983 art. The integrated features of the components of the arbor bolt system create a stronger assembly than offered in Huxford (1983), Mayer (1988) or McKinley (2003).

CONCLUSION OF INVENTION BACKGROUND STATEMENT

All tine type plow layer deep vertical tillage technology that exists today falls short of the ultimate mark of excellence and effectiveness. That mark is consistency in depth of soil penetration. If this function of the machine is not consistently maintained, the technology fails in the fundamental purpose for using it, restoring water and air exchange. Failure to achieve sufficient operational depth of the tillage tine renders the operation a failure.

The combination of the tandem roller frame design and the easily serviceable, infinitely adjustable and reliable roller and tine assembly disclosed, uniquely address these fundamental considerations.

Previous art has never afforded the type of design features necessary to alter the tines' tillage locations. One of the two embodiments of the roller assembly disclosed makes that possible and practical.

In conclusion, the vertical tine tillage technology disclosed is a primary tillage device coupled with a variety of secondary tillage tools offering a wide range of applications heretofore not achievable in one pass or multiple passes. The machine described in this disclosure does not claim to be able to transport any soil from within the plow-layer to the soil surface to create a seedbed. Therefore, these combined technologies achieve the goals consistent with no-till farming concepts with regard to root system preservation and surface residue management. This, while reducing soil bulk density like conventional tillage techniques used to produce "normal" plant root systems, does so without the risk of soil erosion due to wind or water which characterizes all other approaches to agricultural tillage.

FIGURE DESCRIPTION

Figure Index

FIG. 1: Typical tillage patterns for a single rank machine and the tandem frame design tillage machine of the same working width. The illustration assumes an optimal 40 degree helix for both at the same swingarm angle offset from the direction of machine travel. The roller used consists of 6 groups of tines. The spacing is identical between the tines in both embodiments.

Figure 2:
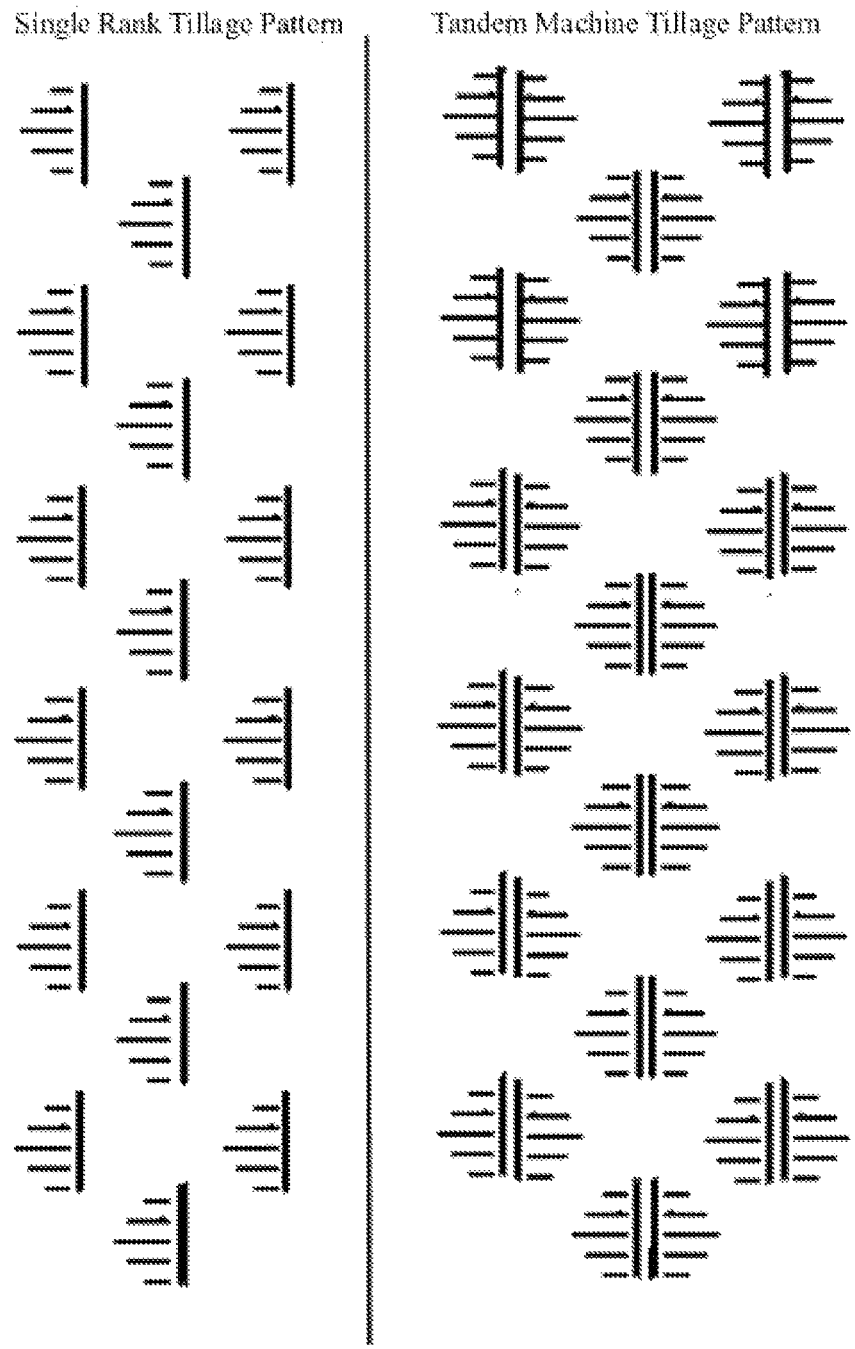

FIG. 2: Typical tillage patterns for a single rank machine and the tandem frame design tillage machine of different working widths. The illustration assumes an optimal 40 degree helix for both at the same swingarm angle offset from the direction of machine travel. The roller used consists of 3 groups of tines. The tandem frame tines are spaced an additional 33% apart illustrating the outcome of taking advantage of the secondary roller to increase total tillage while reducing tines required per rank by $\frac{1}{3}^{rd}$.

Figure 3:
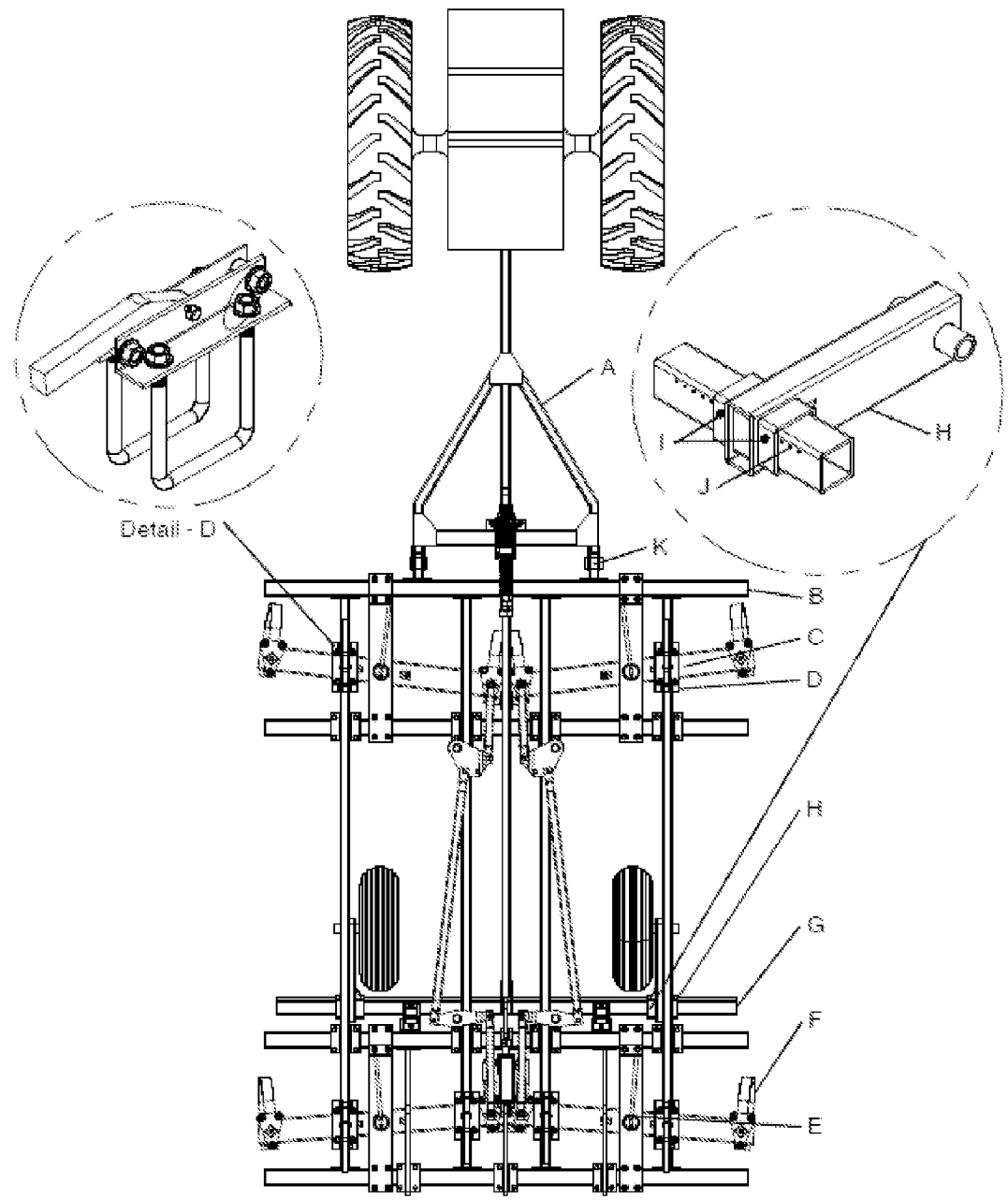

FIG. 3: This machine is set up with a double offset roller arrangement in a typical pattern. The over-center type of lockdown illustrates one preferred embodiment for securing the swingarm to the machine frame which permits infinite adjustability. More than one lockdown may be required on longer swingarm assemblies. The transport wheel spacing is adjustable for special tillage operations such as reconditioning permanent beds and ridges.

Figure 4:
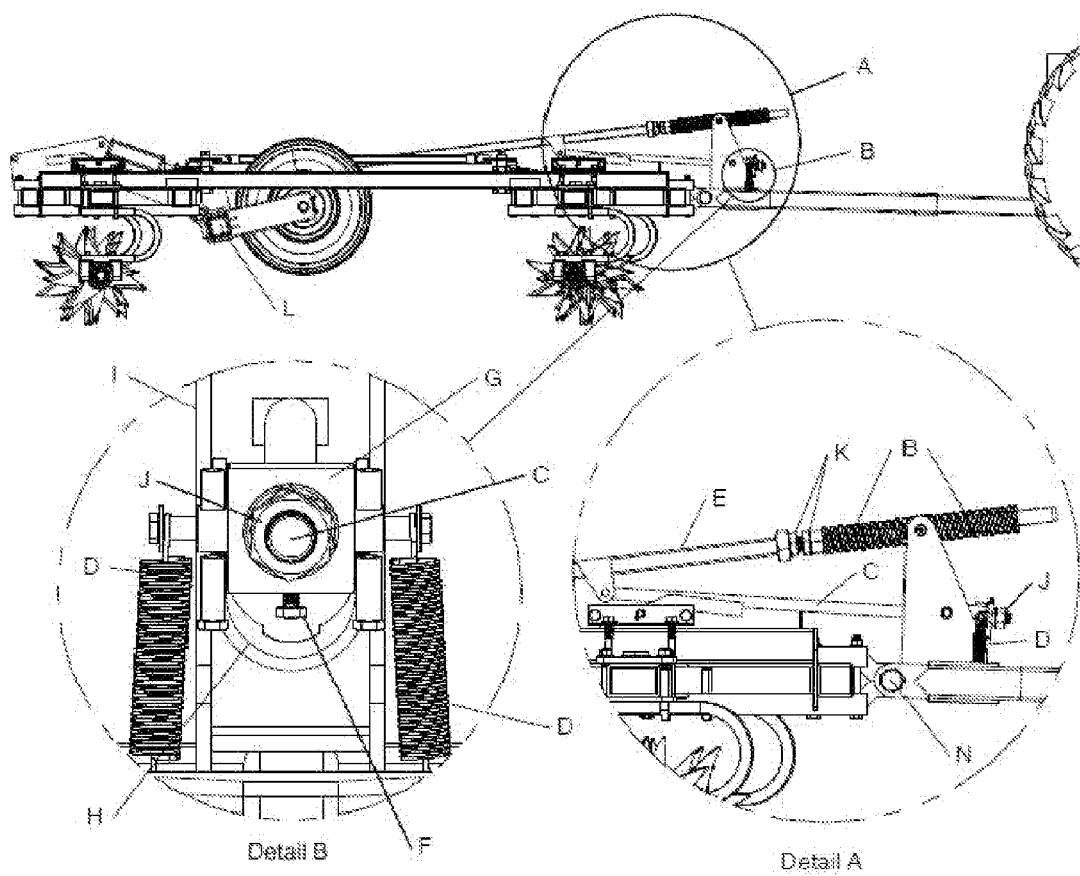

FIG. 4: Discloses frame self-leveling linkage system and semi-automatic resetting trip mechanism for protection from obstacles in soil such as rocks.

Figure 5:
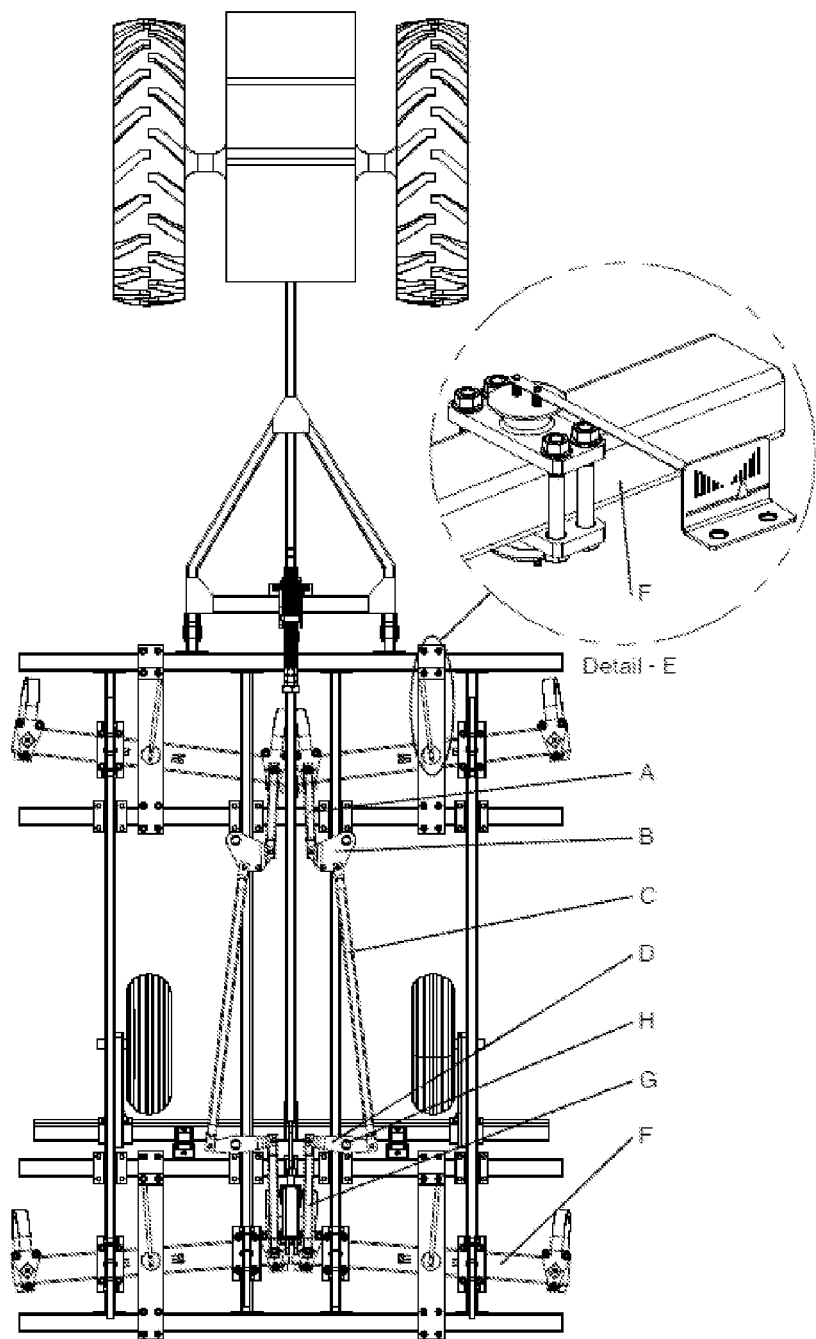

FIG. 5: A rigid frame embodiment of the tandem roller frame using double-offset roller assemblies, illustrating a linkage system for remote swingarm adjustment. Also illustrates one embodiment of an indicator for swingarm offset angle.

Figure 6:
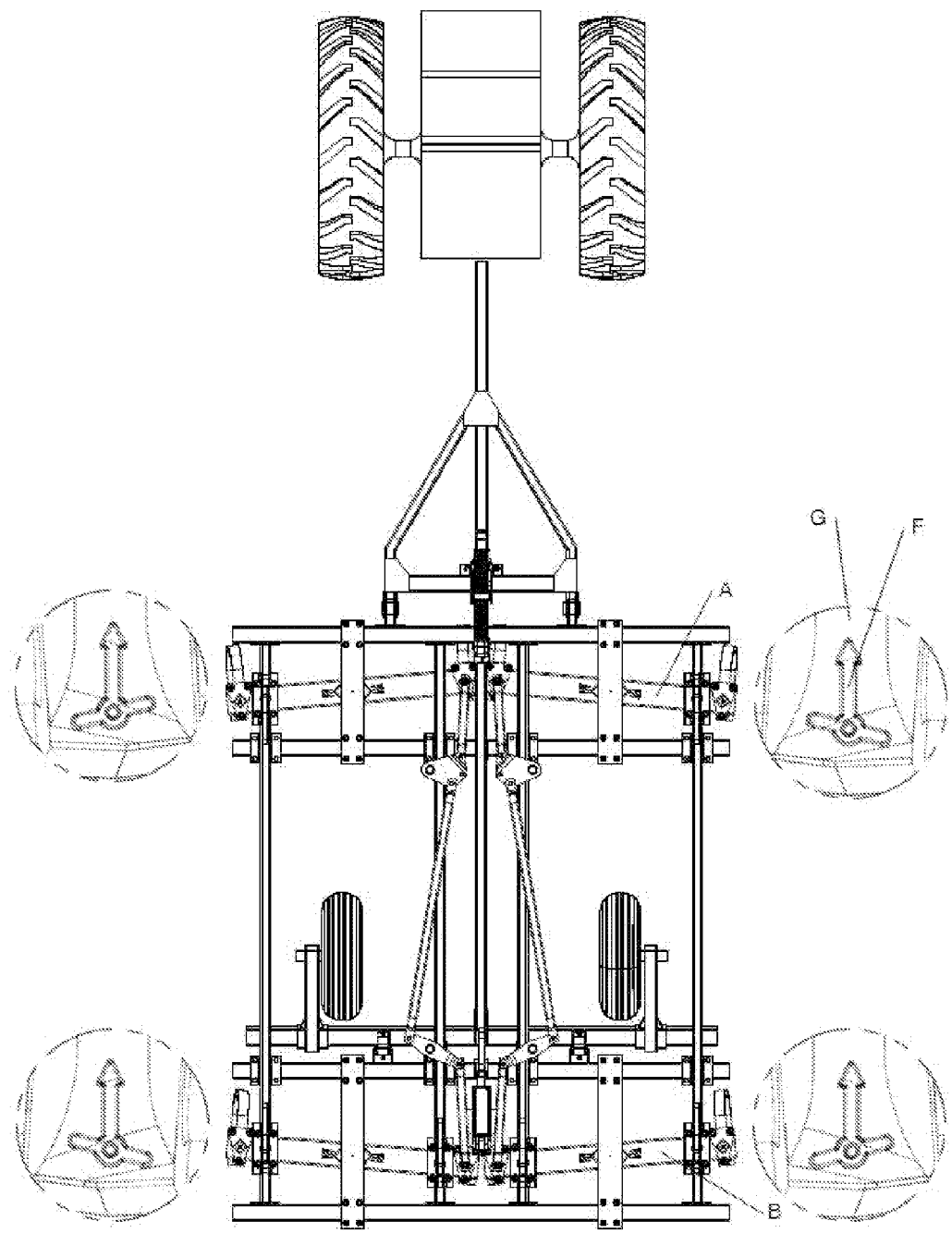

FIG. 6: Discloses embodiment for double offset tandem frame in a diamond arrangement.

Figure 7:
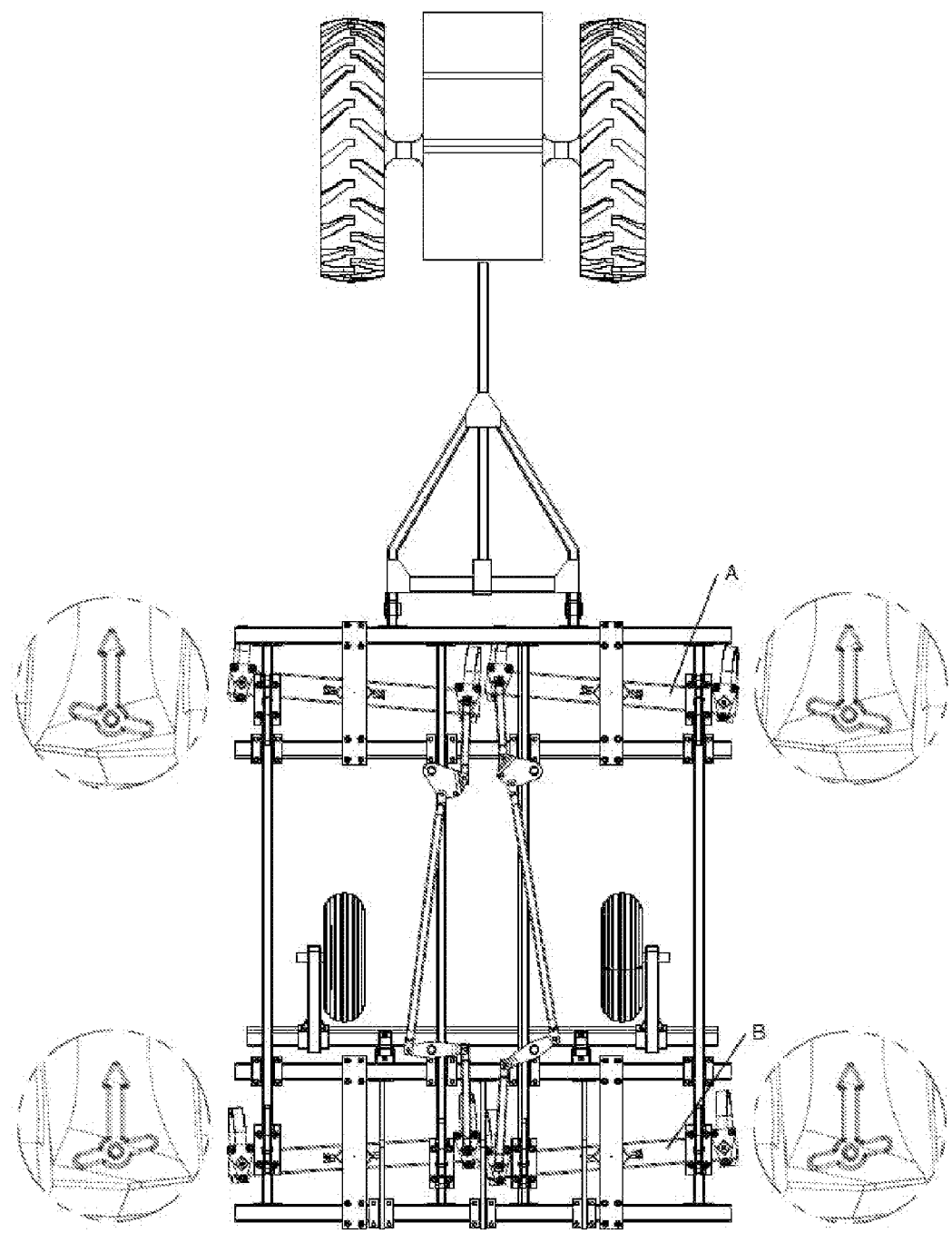

FIG. 7: An embodiment using a single offset tandem configuration showing tine placement.

Figure 8:
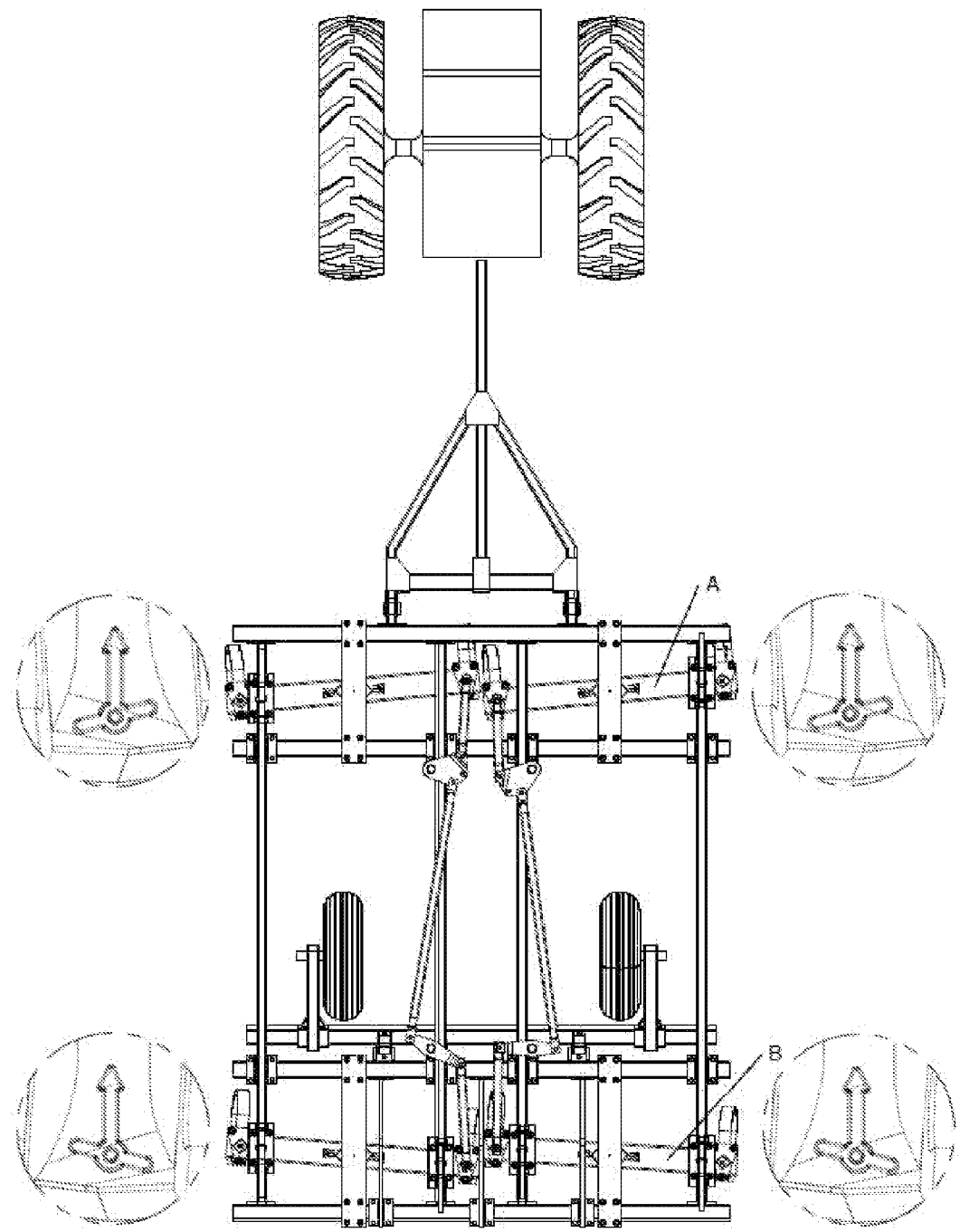

FIG. 8: An embodiment using a reversed single offset configuration showing tine placement.

Figure 9:
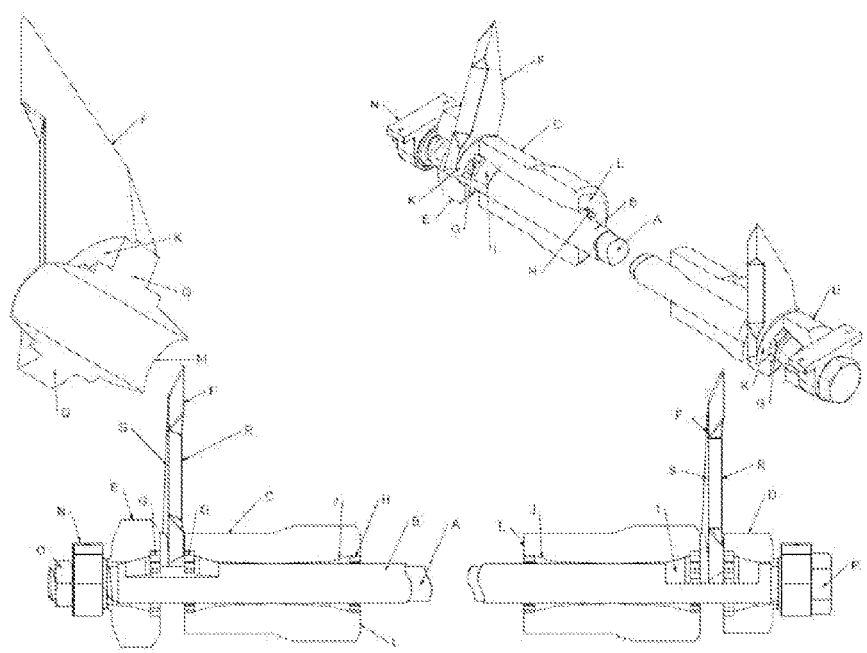

FIG. 9: Describes component parts of the Arbor Bolt Tine-Type soil aerator roller assembly. This drawing discloses the general pattern of parts used to create different sizes of assemblies for different width machine configurations.

Figure 10:
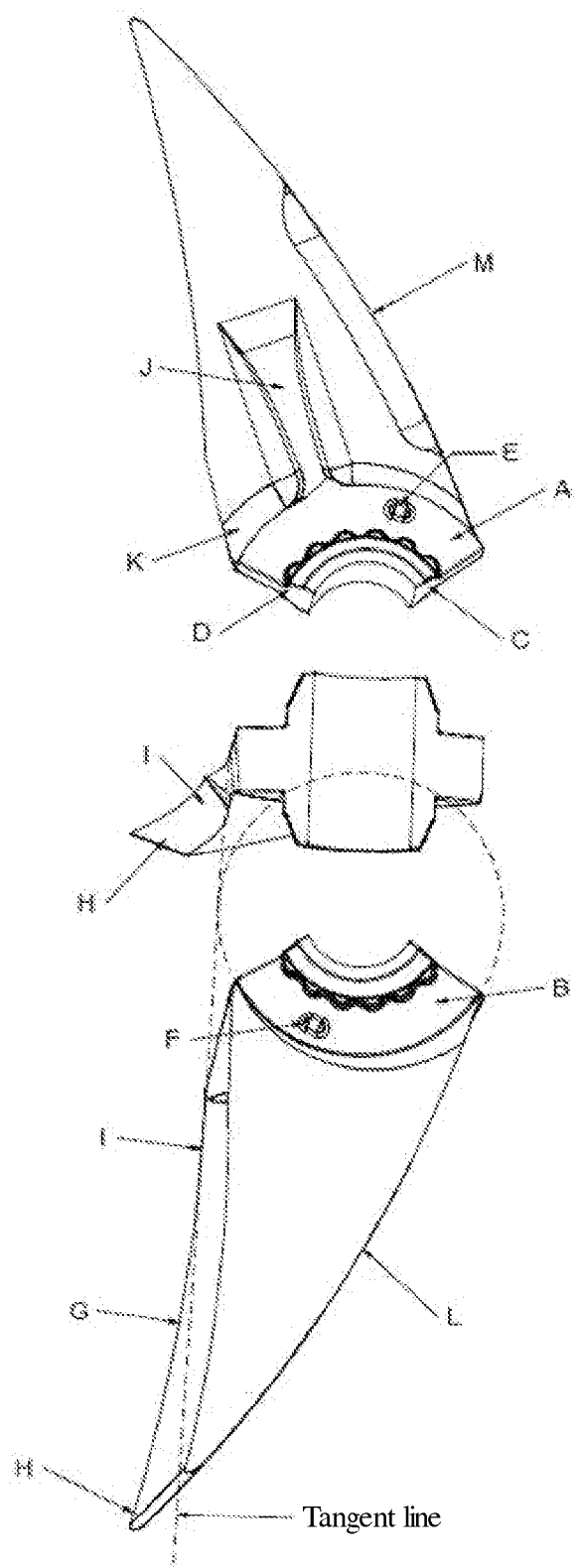

FIG. 10: Describes specially designed tine disclosed for exclusive use on tandem roller frame machine design (Martindale 2007) in conjunction with arbor bolt roller assembly.

Figure 11:
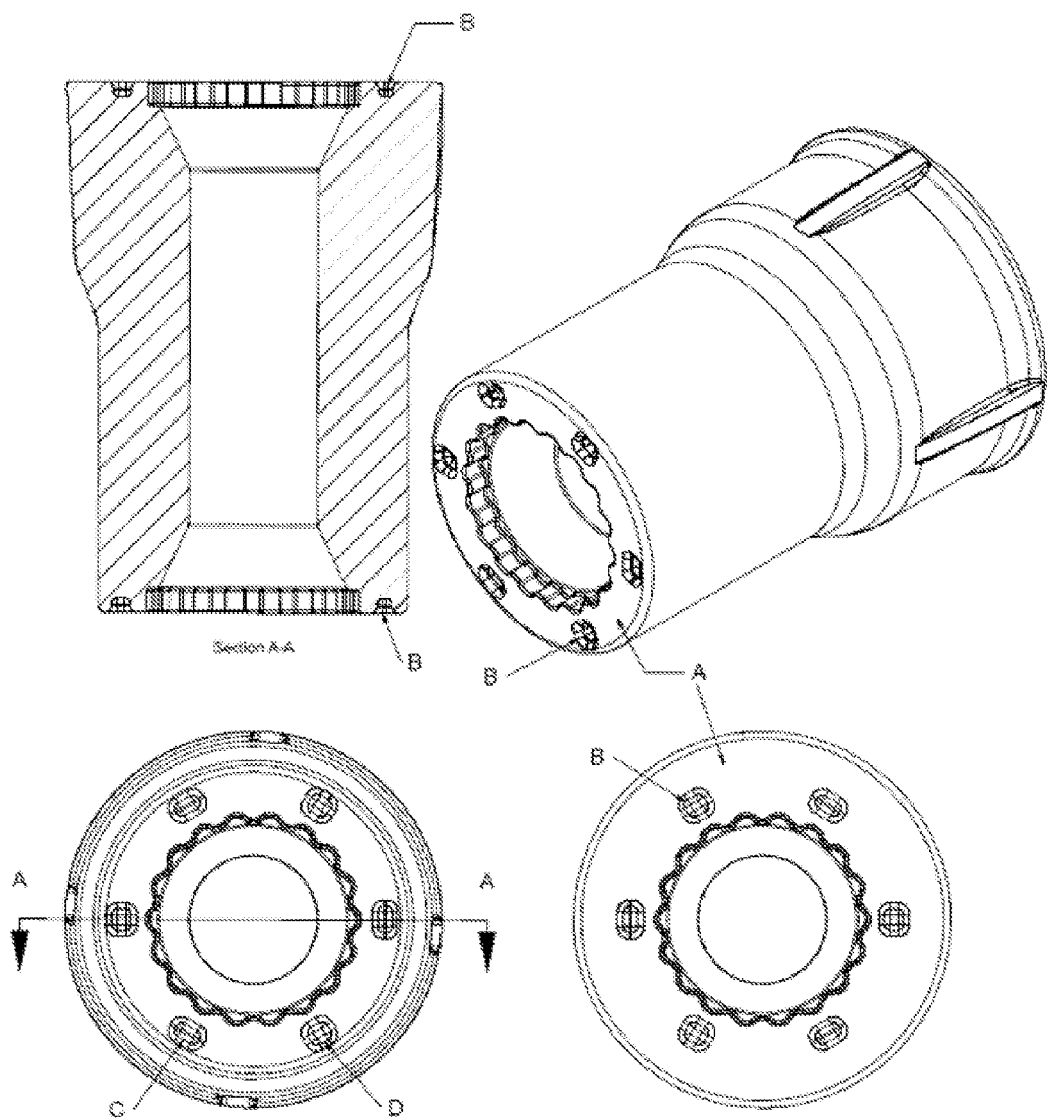

FIG. 11: Describes standard spacer used in the Arbor Bolt roller design, including detents, tapered counter bore and helix setting components.

Figure 12:
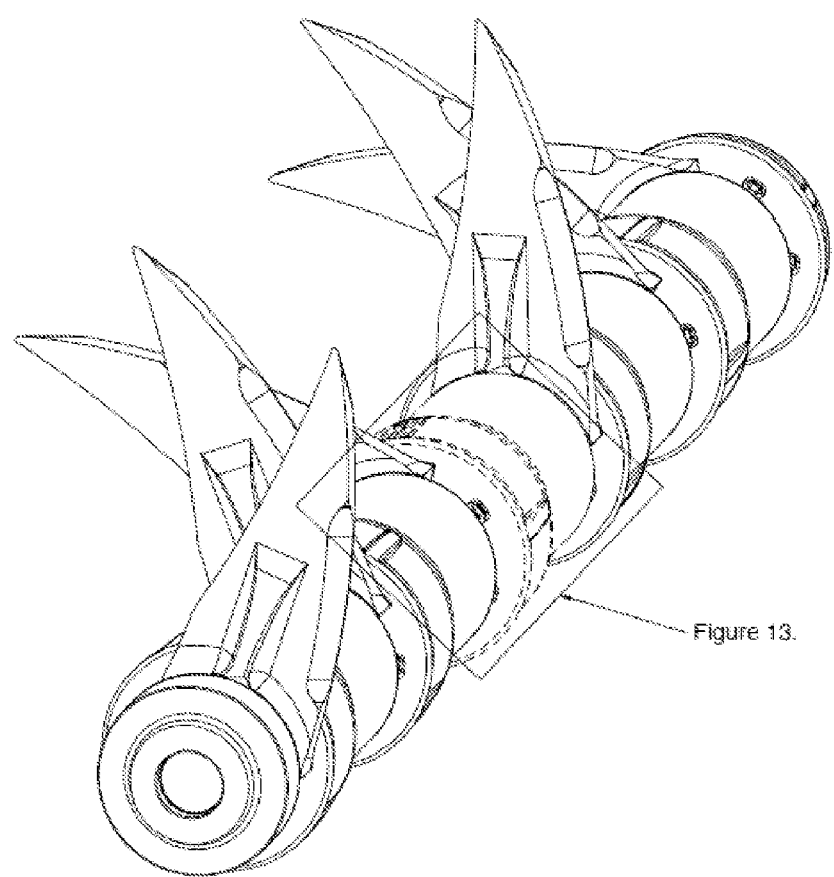

FIG. 12: Describes the location of the specially design center spacer on roller assemblies with six or more triads of tines. This spacer is designed strictly to rephrase the helix of the second set of three triads to establish a clockwise and counterclockwise compound helix.

Figure 13:
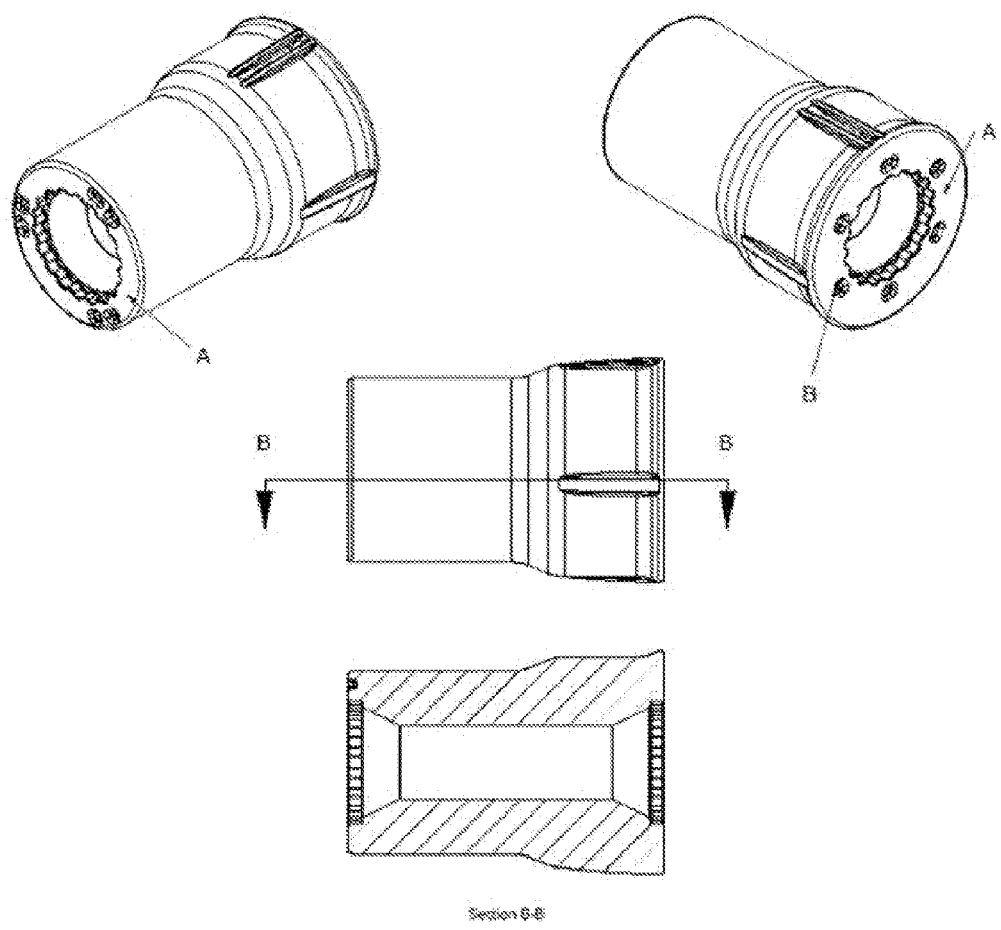

FIG. 13: Describes the spacer identified in Figure D in detail.

Figure 14:
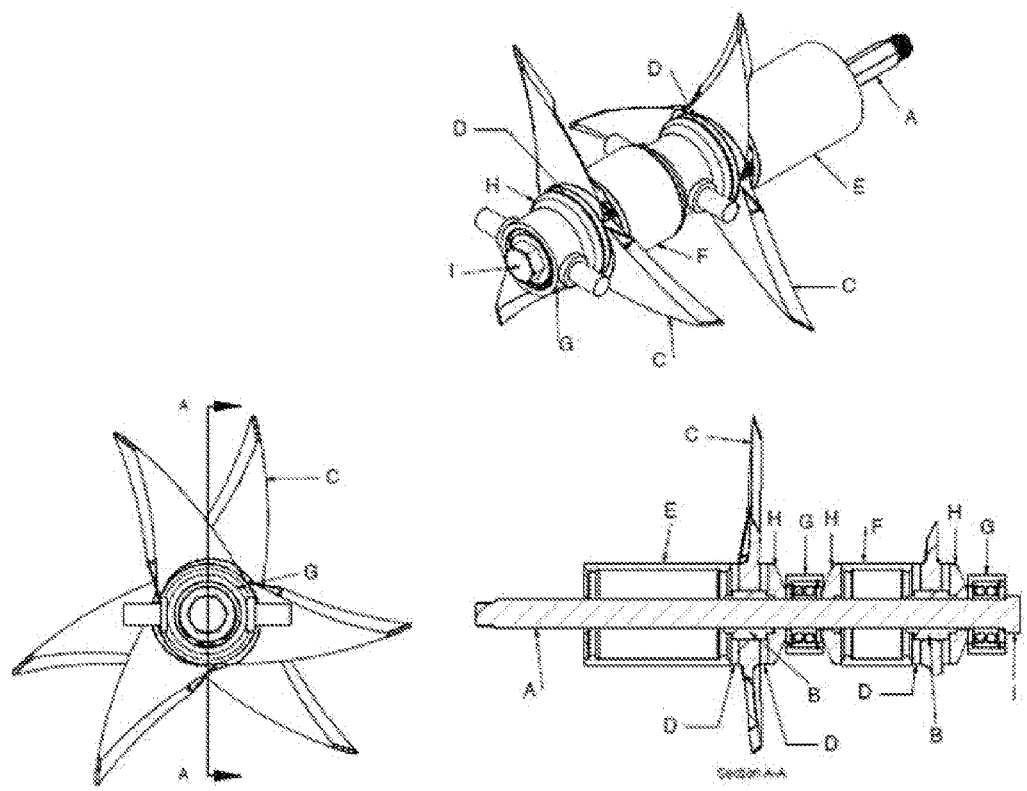

FIG. 14: Illustrates component parts of the Doweled Arbor Bolt Soil Aerator Tine Assembly System. This drawing discloses the array of parts used to create different sizes of assemblies for different machine widths.

Figure 15:
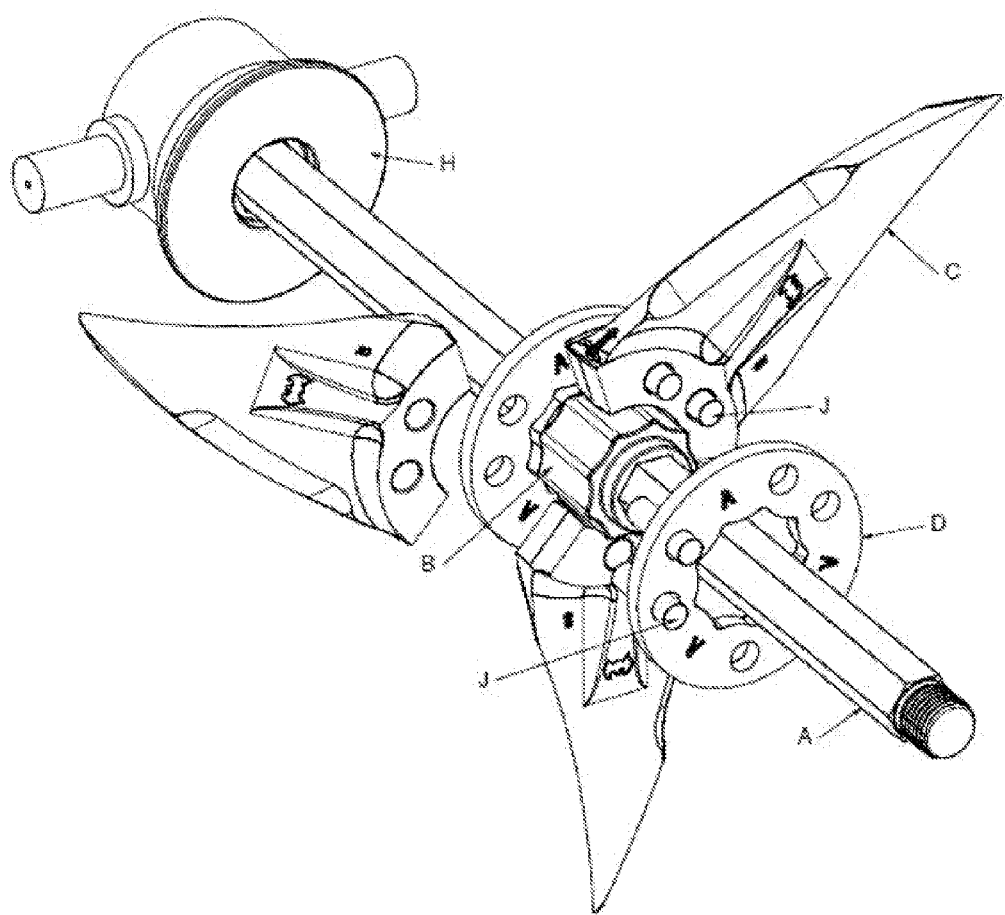

FIG. 15: Illustrates the basic assembly protocol for the dowel pin system in this case using a hexagonal arbor bolt for drawing the system together.

Figure 16:
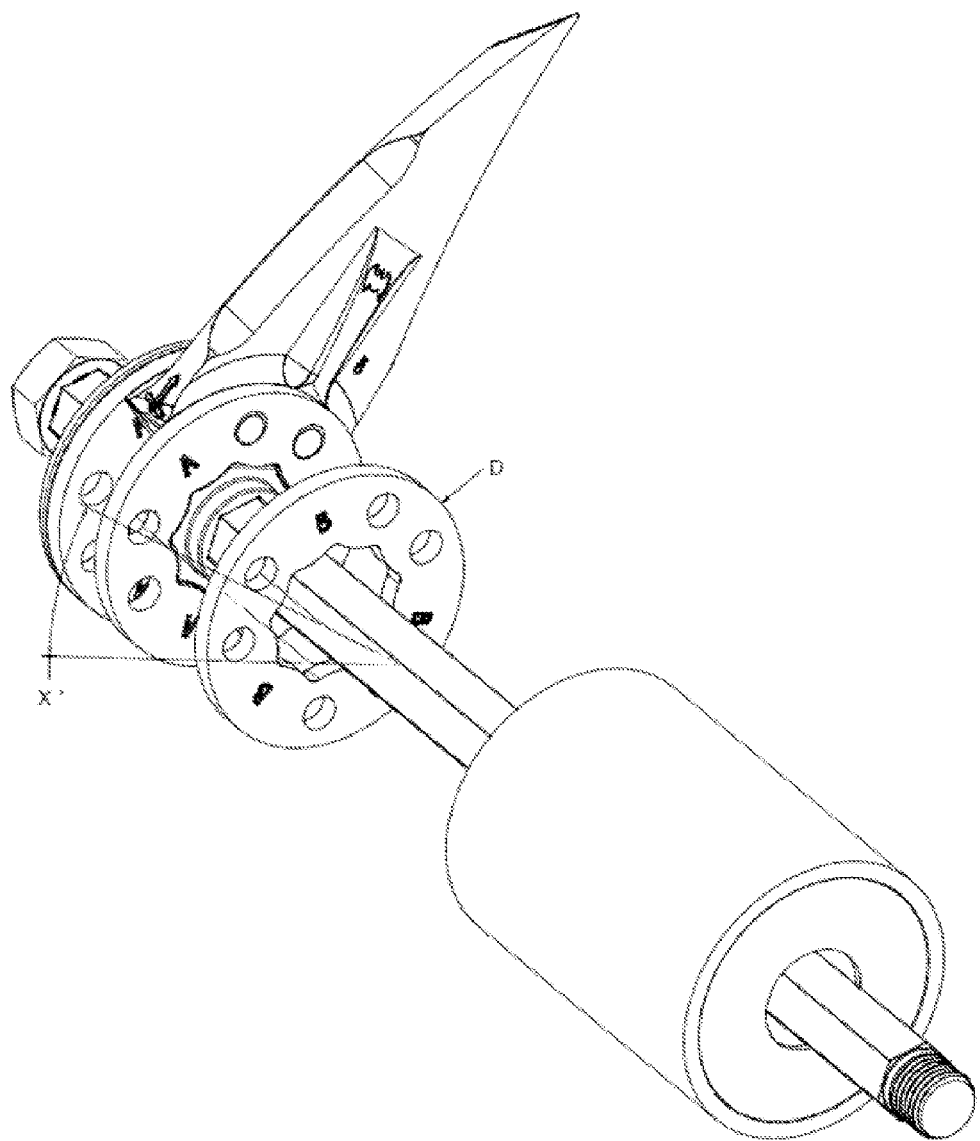

FIG. 16: Illustrates the clamping ring reversal to establish a different phase in a segmented helical design.

Figure 17:
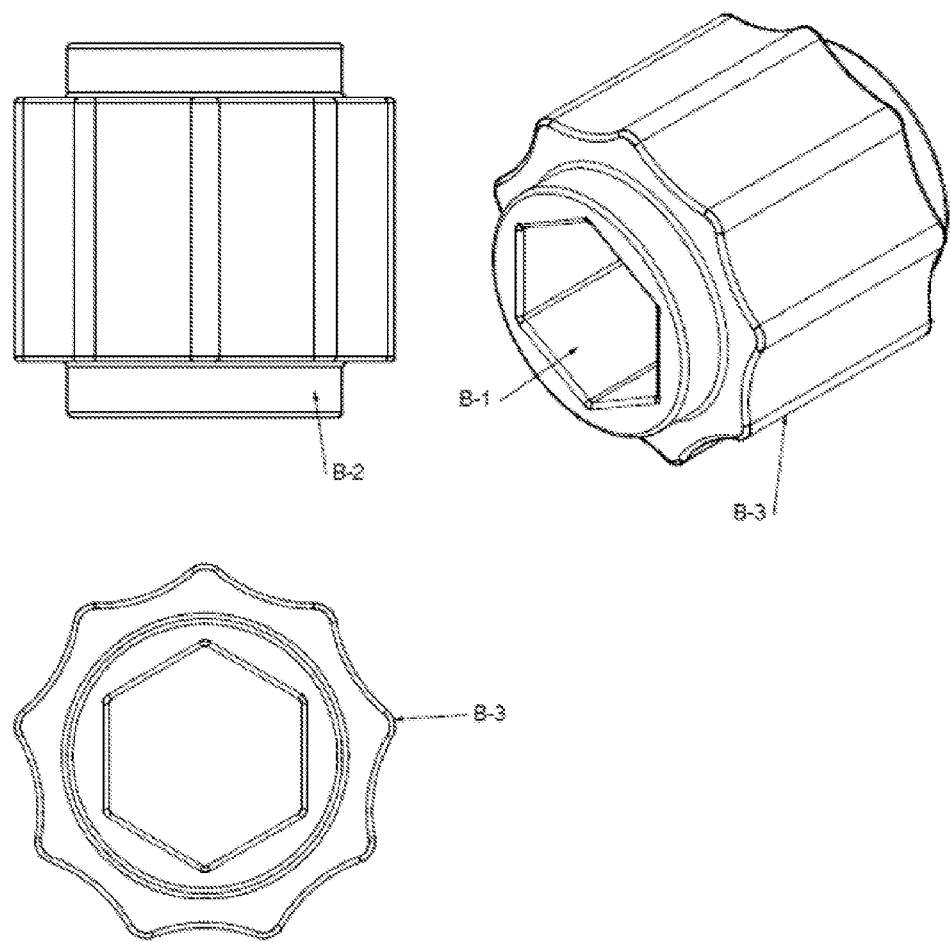

FIG. 17: Illustrates the central hub which transmits rotational force from the arbor bolt to clamping ring and vise versa while maintaining tine group positioning the helical pattern of the roller assembly.

Figure 18:
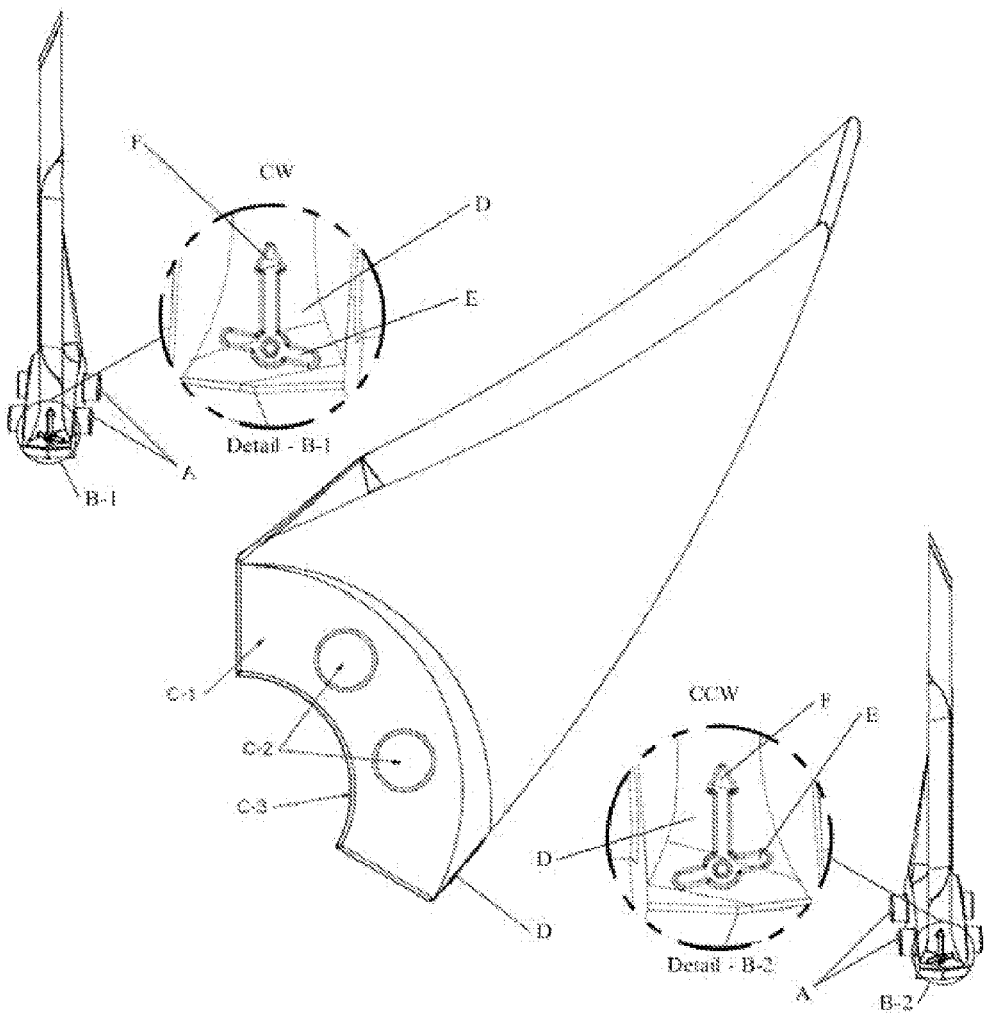

FIG. 18: Illustrates the revised design of the tine base for accommodating dowel pins which affix the tine to the clamping rings.

Figure 19:
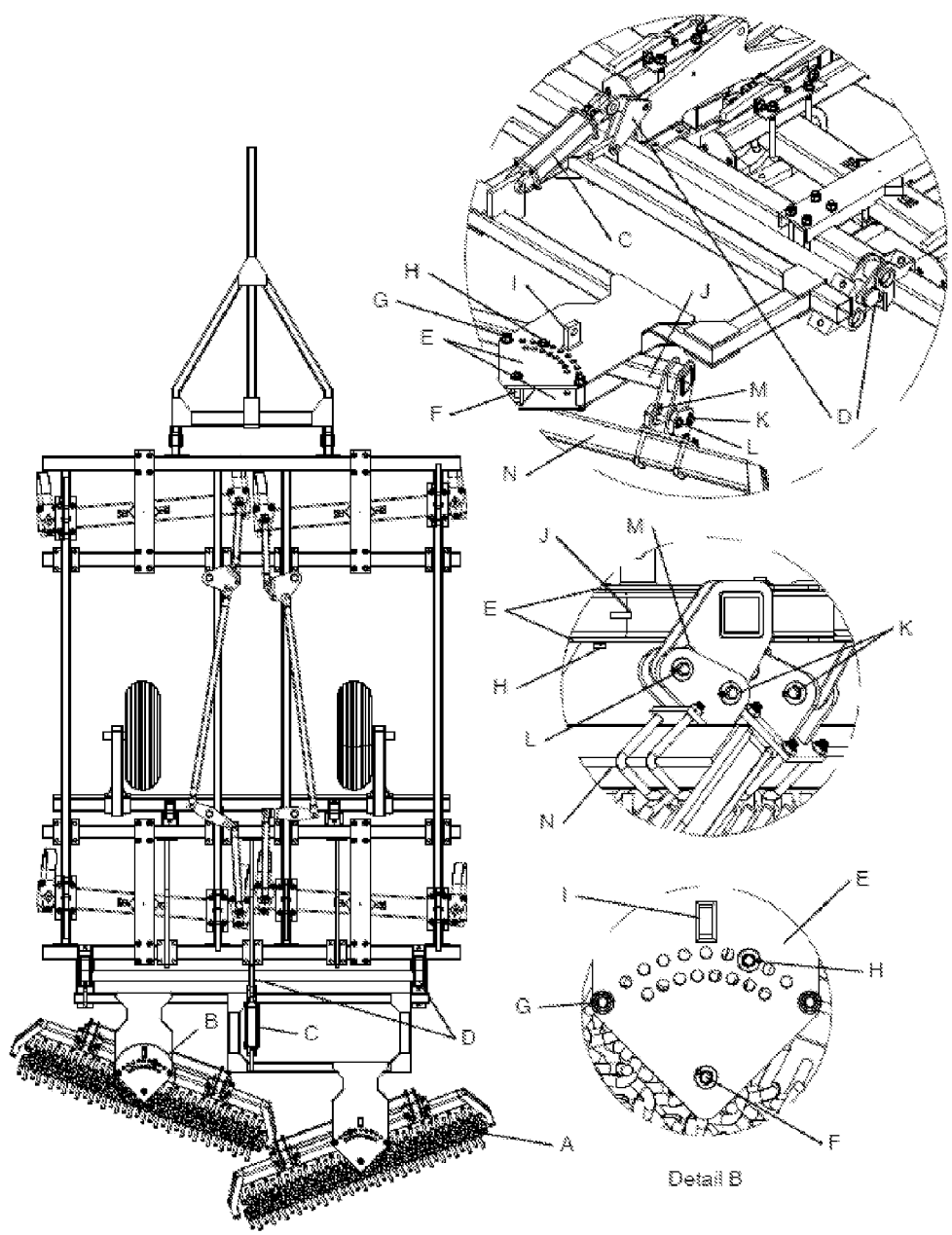

FIG. 19: A preferred embodiment combining the action of the rotary harrow technology on a single-offset tandem frame. The harrow mounting discloses parallel lifting linkages and harrow tillage alignment through the full range of harrow offset adjustment.

Figure 20:
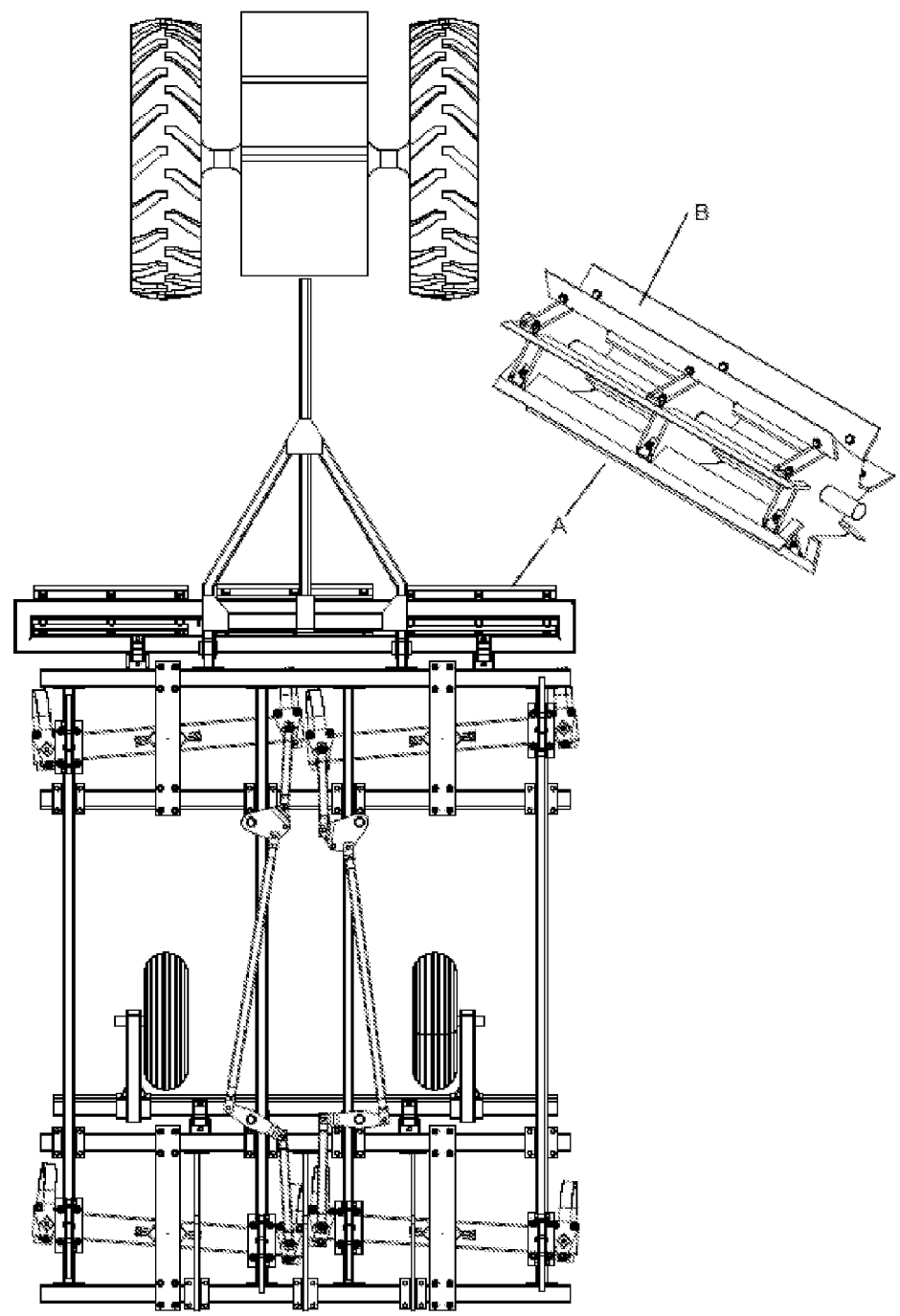

FIG. 20: This embodiment of the tandem frame includes attaching a rotary chopper on the front of the main frame. The attachment is interchangeable to a rear mounting.

Figure 21:
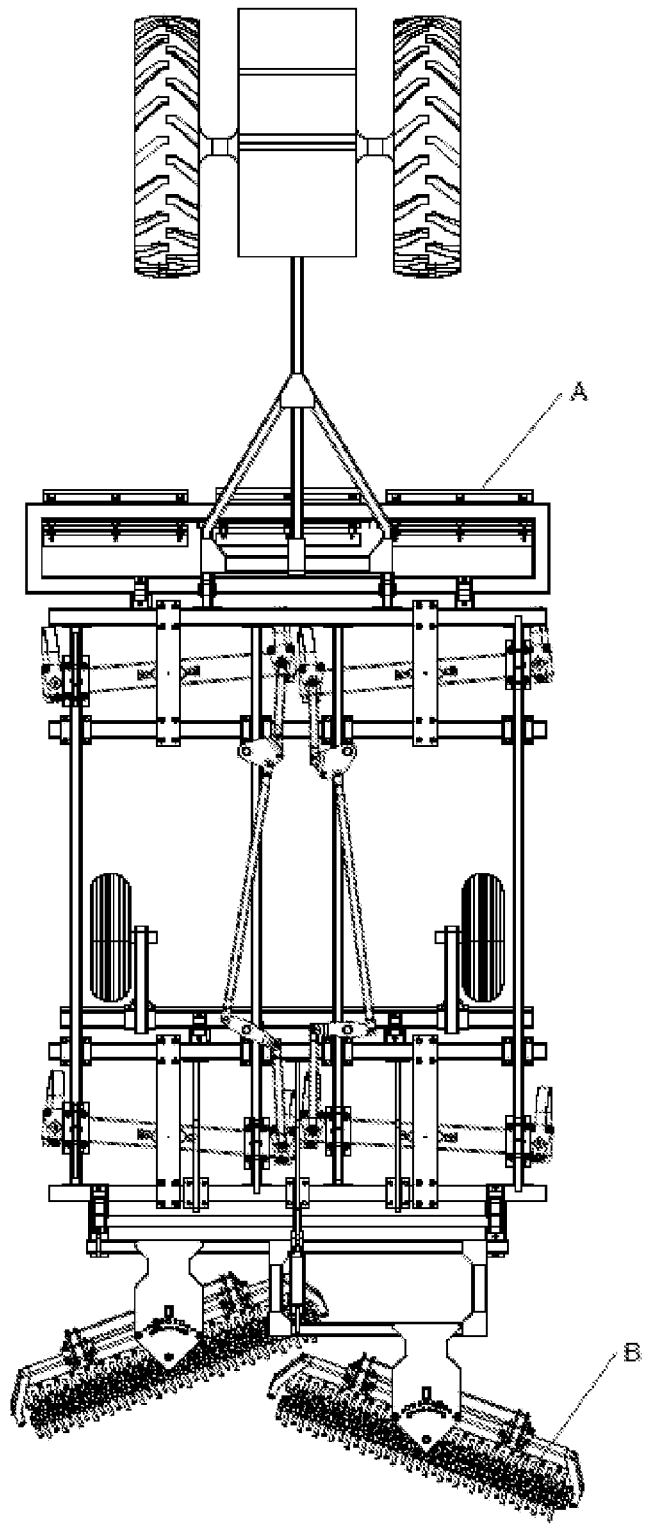

FIG. 21: Illustrates the frame embodiment with both rotary harrow and residue choppers for resizing plant residues and even distribution attached.

Figure 22:
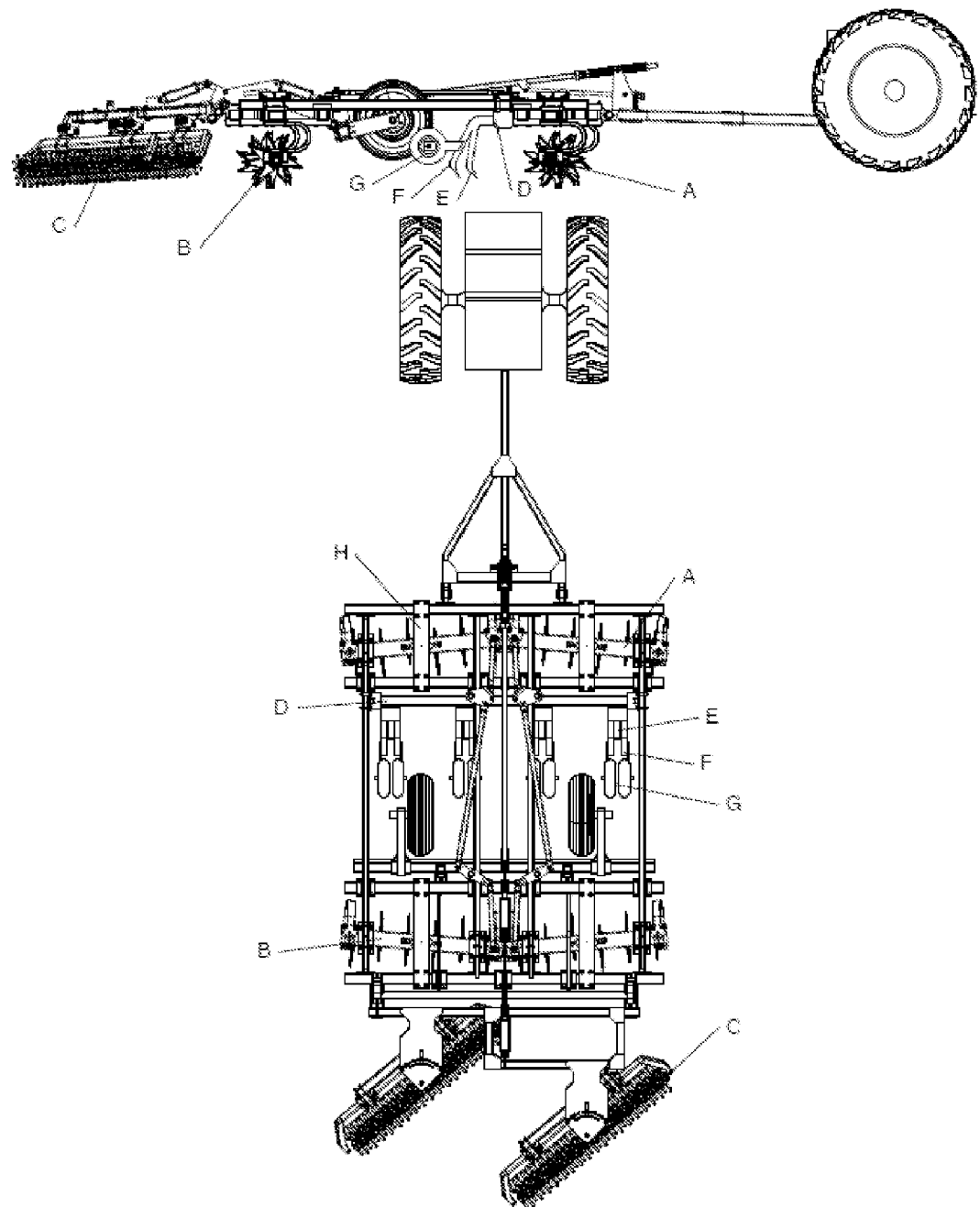

FIG. 22: Illustrates the complete machine with shanks for strip-till and seeding attached.

DETAILED FIGURE DESCRIPTIONS

Before discussing the frame design elements it is beneficial to examine the tillage pattern of this advancement in vertical tine tillage by comparing it to the prior art that has all presented a single insertion of each tine to create fracture forces.

The extent of the forces created is illustrated in FIGS. 1 and 2 as single rank tillage patterns and as the tandem frame tillage patterns. The unique contribution of this disclosure is that the second rank of tillage tines is automatically timing itself to enter the soil in the same place a second time. The impact in FIG. 1 is illustrated using the same tine spacing which would be common in this type of technology or about 7.5 inches (18 cm). In FIG. 2 the tillage tine spacing for the tandem frame design is increased by 33%. This translates directly into 33% more mass from any given frame weight to penetrate the soil. The second rank, since it uses the same hole requires virtually no ballasting or frame weight to enter the soil. Assuming the same amount of fracture from the tine insertion in single and tandem rank machines it is also obvious that the total soil fracturing which is taking place is close to 33% greater. By adjusting the rear roller to be more aggressive the additional tillage can be increased to over 50% more than a single rank design. The design components disclosed in the tandem roller frame all center on this unique ability of the front and rear tillage tines to create fracture forces from the same insertion location. This represents a much more efficient way to increase total tillage without requiring multiple passes over the field. The greater tine wear is concentrated in the front of the machine on relatively fewer tines. Rear tillage tines experience very little wear by comparison because they do not have to form a new entry location. Lastly, neither the front nor rear rank requires acute angles of offset in order to make significant reductions in soil bulk density. The more modest angles provide improved surface conditions for secondary tillage or planting operations to follow and reduced wear rates of the tines.

The frame disclosed here resembles that of the traditional tandem (double-offset) or single-offset disc frames, where gangs or ranks of soil engaging tooling are organized into a front and rear set similar to FIG. 3. The frame (B) is attached to the prime mover, usually a farm tractor through a tongue or hitch (A) assembly. Since the machine must be able to follow undulating field terrain, the hitch (A) is able to pivot about the attachment points (K).

Swingarms (C) are located in the frame members using a position lockdown device (D) and a center pivot point (E). The center pivot permits the swingarm assembly to rotate clockwise and counterclockwise from the perpendicular to the direction of the machine travel. The center pivots are located in the frame so that the front and rear rank tillage tines are aligned (as seen in FIGS. 1 and 2 "Tandem Frame Tillage Pattern") and are adjustable. The soil engaging roller/tine assemblies are attached at the swingarm by a bracket (F) which is common to the art. The lockdown device (D) permits infinite adjustability necessary for the proper performance of the tandem roller frame machine and its unique tillage tine.

The frame and its working components are raised and lowered from an axle (G) and wheel lever assembly (H) for obtaining different working depths of the machine and for transport on farm lanes and highways. The wheel arm is outfitted with detents (J) and setscrews (I) or other provisions common to the art, so that the wheel spacing can be adjusted to fit various row spacing requirements. This is especially useful when used for re-conditioning permanent raised beds or ridges arranged on contours of sloping fields for erosion control.

The tandem roller frame requires superior ground-following design provisions and leveling in order to perform the multiple operations which it is equipped to perform. In FIG. 4 a self-leveling linkage system (A) consisting of an adjustable rod (C) which is attached at the rear to the transport axle (L), two compression springs (B) and a series of nuts (K) common to the art are disclosed to level the frame and supply flexibility when traversing undulating terrain.

Because the same frame needs to be able to be rigid through the hitch pivot (N) to the tractor in order to add frame mass for adequate ballasting for front tillage tine penetration or other operations such as resizing crop residues (see FIG. 20), a semi-automatically resettable linkage system (A) using an adjustable rod (C) is attached to the leveling link rod (E) and held in place by return springs (D). The over-center break away pressure is determined three ways; 1.) Rod (C) length as determined by nut (J) adjustment, 2.) setscrew (F) adjustment which determines the amount of over-center misalignment of the shaft and 3.) transport axle (L) position. When the transport axle is in the fully raised position, then the rod is at its rear most position. The rod length adjusting nut (J) is adjusted so that it comes to rest against the trunnion (G). Whenever the transport axle is lowered the length of the rod is increased and the machine is increasingly under the control of the leveling linkage return springs (B). When the lifting of the front of the frame takes place beyond the limits of the rod length, the trip operates by raising the setscrew saddle (H) to release the front of the machine and rear half of the hitch to rise over the field obstruction. The combination of frame weight, return springs (B) on the leveling linkage rod (E) and the over-center trip mechanism return springs (D) all combine to return the trip mechanism to the normal rigid operating position. If these forces are inadequate to return the trip to the locked or rigid hitch position the wheels are simply lowered slightly, lengthening the trip rod until the over-center position is achieved with the rod (C) resting against the setscrew (F) in the saddle (H). Then raising the wheels again resets the linkage with the preset amount of force needed to complete the tripping action by causing the adjusting nut (J) to contact the trunnion (G).

In situations where ballasting requirements exceed frame weight combined with other attachments such as seed or fertilizer hoppers, the over-center trip mechanism can be adjusted to transfer weight from the rear of the tractor through the hitch assembly to the soil engaging or other attachments such as a crimper or cutter shown in FIG. 20.

Swingarm offset accuracy is important to proper machine performance. FIG. 5 discloses one possible embodiment for a visual indicator assembly (E) for showing relative position of the swingarm (F). This particular arrangement would be visible from the tractor operator's position and would be used when remote swingarm adjusting is installed. The remote adjusting system attaches the swingarms (F) by links (A) and (G) to a rotating plates (B) and (D) which would be powered manually, electrically and hydraulically as is common in the art. The rear attaching link (C) length is adjustable to obtain a differential as may be desired between the front and rear tillage tine thrust forces. The plates (B and D) are rotated about a shaft (H) attached to the machine frame.

Since tillage requirements by crop, soil and terrain conditions and machine sizes can create multiple requirements for controlling thrust forces created by the action of the tillage tine as it laterally fractures soil, FIG. 6 discloses tillage tine application markings (F) which are located on the tine blade boss (G). These symbols are mated with design details of the tine blade which produce the unique capabilities of the Huxley (1983) art. That art requires the angle of attach of the blade be either clockwise or counterclockwise of the travel direction axis. So it is that the cross bar at the base of the arrow symbol depicts the direction of the swingarm onto which the tine is to be affixed.

FIG. 6 discloses an alternative assembly protocol for the tandem roller frame called a diamond configuration. Swingarms (A and B) are placed in opposite offset positions compared to the double offset configuration in FIG. 5. This design feature is useful when the machine is being required to negotiate many corners in irregularly shaped fields. It helps to dramatically reduce excessive and unnecessary thrust forces on suspension system components and framing. Since the swingarm offset angle and tillage tine geometry are complimentary as disclosed in FIG. 5, it is necessary to interchange front and rear roller and tine assemblies correctly to create a different geometry. In this change of configuration rear and front assemblies are exchanged on the same side of the machine.

Roller Assembly Interchange and Maintenance

The change in offset of the front and rear gangs or ranks which is observable between FIGS. 5 and 6 are significant because the frame design which enables rotation about the swingarm pivot permits the removal and relocation of rear tines to the front and performance criteria adjustments simultaneously.

Since front gang tines wear much more rapidly than do those on the rear of the machine, the rear roller assemblies are installed on the front of the machine when it is time to replace the worn front tines. If the rollers are interchanged diagonally, then the configuration remains the same. If the rollers are interchanged from rear to front on the same side of the machine then the swingarm offset is reversed as seen here in FIG. 6 as noting the swingarm positions of A and B.

FIG. 7 discloses a single offset configuration of the swingarm assemblies. In this embodiment the front rank swingarms (A) are rotated clockwise from an axis that is parallel to the direction of travel. The rear swingarms (B) are rotated counterclockwise. If the roller assemblies are interchanged diagonally, then the configuration will remain unchanged. If the rollers are interchanged by being brought forward on the same side of the machine then the offset angle is reversed to a clockwise rotation of the axis and will appear as the configuration in FIG. 8.

Roller Assembly Interchange and Performance Traits

The double-offset configuration produces self-cancelling thrust forces which concentrate in the center of the machine frame. This is advantageous when folding wings are added to the base unit. Thrust forces can be sufficient to lift center sections out of the soil. So any combination of swingarm configurations can be employed in the construction protocols of the machine in relation to field conditions to achieve the optimal field performance characteristics.

One example of this is in the use of the single-offset configuration to permit the tractor drawbar to be allowed to swing freely. When an obstacle is encountered in the soil the machine frame can rotate and relieve stresses that could otherwise cause serious damage. Adjusting the front and the rear ranks independently will create equal opposite thrust forces so that the tillage tine holes align for proper performance.

Embodiments of the Vertical Tillage Tine and Roller Assembly for the Tandem Roller Frame This section of the disclosure details two possible embodiments for a tillage tine which is defined specifically for the tandem roller frame machine design. This refinement is necessary because the previous tine by Martindale (2005) is too aggressive in the tandem design to achieve the least radical objectives and in contrast, more aggressive than necessary for maximum soil disturbance.

FIG. 9 discloses the components of an arbor bolt roller construction system. This first embodiment relies heavily on cast components. It therefore has serious shortcomings in terms of flexible tine spacing and inclusion of bearing locations inter-spaced on the arbor shaft while maintaining helical arrangements.

The arbor bolt (A) is a commonly applied technique in agricultural disc harrow designs because it expedites maintenance and adjustment (retightening the assembly) by eliminating large quantities of small fasteners in current designs. The unique combination in this embodiment of the invention includes a tube (B) and conforming tine features such as the inside radius of the tine base (M) assure that the assembly, when once tightened with the retaining nut (O) on the arbor bolt, will stay tight and maintain the prescribed tine intervals while enabling individual tine replacement as required or total replacement of tines when deemed necessary.

The spacer (C) consists of several features for accomplishing several different purposes. The spacer has a total of three different configurations for application at different locations in the roller assembly. The double spacer (C) is built as a receiver to accommodate a group of three tines at either end of the spacer. Spacer (D) is a shortened version of the double spacer and consists of the smaller circumference end for installation at the end of the assembly to contact the bearing and retain the tine from the relief side (R) of the tine. Spacer (E) in contrast is the shortened version of the double spacer for the opposite end of the assembly. The larger circumference portion of the spacers (C) and (E) prevent soil movement upward when lateral thrust force is applied at the compression face (S), during the fracturing process and provides additional strength to retain the tine against the tube (B).

The tines (F) must be retained in proper relationship with each other across the entire assembly in order to provide the uniform helical pattern or tine interval. This is achieved by using gear-like teeth (H) on the inside bore of the spacers (C, D, E) which, mesh with mating gear-like teeth (G) on the tine base. One embodiment of the interlocking devices could be created as a tapered spline as long as the intervals between the spline segments create the desired helical pattern. While the embodiment disclosed herein describes gear-like teeth, the invention disclosed could also be accomplished with other interlocking forms as is common to the art.

The wedging action which can be achieved by a tapered spline assembly is achieved in this disclosure by a tapered counter-bore (J) in the inside of the spacers. As the arbor shaft is drawn by the retaining nut (O) while being held by the head formed (P) at the arbor bolt opposite end, the two tapers, (I) on the tine base and (J) in the spacer bore interfere.

The tubing (B) is engaged by the tine base at (M) when the arbor bolt is stretched inside the tubing. There is a clearance fit between the outside diameter of the arbor bolt and the inside diameter of the heavy walled tubing which engages the tine at (M).

The next engaging surface, which supports the tine groups, is the surface of the spacer which is perpendicular to the surface (L) of the roller spacer (C, D, E) and the tine base face (K). These coincident surfaces also keep soil and plant debris from gaining access to the inner components of the assembly.

The final point of engagement of the tine and spacer assembly is the coincident faces of the tine bases at (Q). The force required to enter the tine into the soil is effectively transmitted circumferentially through the group of coinciding tine bases at Q.

The removal of individual tines for replacement is accomplished by removing one bearing from its mounting, loosening the arbor bolt sufficiently to remove the tine base to be replaced. Replacing an individual tine or group of tines and retightening the assembly.

This disclosure presents a compound or phased 40 degree helix which requires 18 engaging teeth in order to create a uniform 20 degree helix between tine groups for the overall assembly. Numerous other arrangements of these intervals are possible and anticipated by this disclosure. Similar embodiments of this invention could use tine groupings other than a group of three tines, three tines are shown in this disclosure for clarity.

The helical pattern disclosed here includes an equal number of degrees of shaft rotation between each tine entry event and optimal interval of 40 degrees of rotation between adjacent tines in order to prevent soil fracture force interference on the relief-side of the adjacent tine and produce a 45 degree pattern in the soil so that front and rear gang assemblies use the same hole in the soil.

Tillage Tine Blade Design Enhancement Features

Referring to FIG. 10, the opposite faces (A) and (B) of the tine base (C and D) each has a protrusion (E) and (F) located on them. This protrusion is different on either side in order to determine the helical direction of the tine sets. The two shapes cannot be interchanged with the wrong tine in the mating detents of the spacer. The entry edge (G) is chamfered as in the previous art by Martindale (2005) and Huxley (1983) but is disclosed here (FIG. 10) with a progressive chamfer from the tip to base of the blade section. The range of the progressive chamfer can be from 75 degrees to 1 degree progressing from tine tip (H) to base (I) of the entry edge of the tine blade.

The effect of this revised shape of the entry edge is to start the tine entry into the soil at the tip where the tine velocity is greatest producing the initial impact to start the penetration into the plow layer. The continued downward movement produces a scissor-like action which traps plant materials for more effective cutting action. In addition the tine chamfer is fashioned in an arcuate shape. The range would be from near infinity to a minimum of whatever is necessary to embrace the length of the entry edge. Similarly the edge could be fashioned using multiple small radius-shaped chamfers creating a serrated edge while maintaining an arcuate shape. This adds to the cutting ability of the edge.

Since the tandem roller frame design does not depend on the tine ability to fracture soil on both sides of the tine blade, it is prudent to reduce material costs by eliminating the arcuate reverse side arc and taper of the tine body embodied in Martindale (2005). The tine blade now incorporates a gusset (J) for blade support and large fillets (K) for resistance to breakage. This has rendered the tine ineffective at fracturing soil at zero roller offset angle.

The last feature of importance is the arcuate design of the trailing edge (L) of the tine. When compared to the straight-line features disclosed by other tine-type aerators this provision increases surface area for applying fracture forces by 37%. The erosion of tine trailing edge material normally associated with previous tine designs is also compensated for with more material. The trailing edge embraces the well established chamfer (M) for reducing shaft turning torque.

The spacer (FIG. 11) face (A) contains a series of mating detents equal to a minimum of two times the number of protrusions contained on the tine bases used in the assembly group. The shapes of the detents (C and D) conform to the protrusions on the tine base to create the correct clockwise or counterclockwise helical pattern.

Where desired numbers of tine sets or triads exceed the total possible without the pattern being repeated, it then becomes necessary to rephrase the helix or establish a new starting point. (FIG. 12) This is achieved by creating a spacer (FIG. 13) which locates the detents (A) the required number of degrees offset necessary to establish the new position for the proper starting point.

The spacers are created with distinguishing external markings such as are presented in FIGS. 11, 12 and 13. These arrangements, taken all together, provide a fail-safe assembly protocol.

A Second Embodiment of the Roller Assembly

The second embodiment of the arbor bolt system relies minimally on the production of castings. The spacers are easily altered in length to accommodate tine spacing changes. This is useful in adding bearing support to the arbor bolt. This disclosure uniquely provides a mechanism for maintaining the helical continuity in spite of an interruption for a bearing. The spacer construction protocols also permit inexpensive methods for creating uniquely patterned groups of tillage tines to create tillage zones.

FIG. 14 depicts all of the components of the dowel or locator pin arbor bolt system. The arbor bolt (A) and its basic function in the roller and tine system is essentially the same as the arbor system disclosed above. This arbor bolt in this assembly however, discloses a hexagonal shape but it could be any shape sufficient to engage internal mating geometry in the central driving hub (B). This arbor bolt functions to produce compression forces to align and restrain component parts, and supply rotational torque necessary to enter tines in to the soil and then transmit forces in the opposite direction necessary to enter other adjacent tines (C).

The driving hub (B) has engaging shapes fashioned on the outer diameter, the number of which mesh with the inside diameter of the clamping ring (D). The clamping rings are installed adjacent to each side of the tine base.

Located on either side of the adjacent tine clamping rings is a spacer (E) and (F) which can be created in different lengths depending on the function in the assembly and the operational requirements in the specific cultural practices where the machine is being used. Locations within the roller assembly which require bearing (G) support can be added using a shorter version of the spacer (F). A spacer referred to as an end cap (H) is employed to complete the inboard bearing installation protocol. This same end cap is used when a bearing is being installed in the end of arbor bolt location for example against the hex head (I) formed on one end of the arbor bolt.

FIG. 15 illustrates how the component parts are assembled to create the uniform helical geometry required for optimal soil penetration, and low vibration characteristics of the machine. The arbor bolt (A) creates the central component for propelling and providing propulsion forces to the tine (C). The force is transmitted through the central driving hub (B) to the clamping ring (D) and finally through locator pins cast into the tine base features or dowel pins (J).

FIG. 16 illustrates one example of the technique disclosed here for rephrasing or changing the starting point for a series of tine groups or star sets to maintain optimal tine position intervals within the helix of a roller assembly. The clamping ring (D) is reversible. This is identified by placing a marking such as illustrated with the letters "A" and "B" on the face of the ring. The radial centerline of a tine position is located one-half the number of degrees of differential between the two helix phases such that when the ring is reversed the center line shifts clockwise or counterclockwise the number of degrees necessary to equal the degree interval between the two groups of tines. This particular example is for a 40 degree helix where the rephrasing angle would be 20 degrees. The tine centerline in relation to the driving hub mating surfaces is positioned 10 degrees from the centerline of the tine.

FIG. 17 illustrates the central hub features for propulsion and part alignment. The bore of the hub (B-1) is created to conform to the arbor bolt shape. The extension (B-2) of the inside bore provides a concentric point for the inside diameter of the spacer so that it is always aligned before tightening of the assembly is initiated. The outer shape is determined by the number of tines per revolution of the assembly and the interval that that requires, the number of groups or phases and the number of stars or tine sets per phase.

FIG. 18 illustrates the tine (C) base (C-1) mating surface and dowel pin holes (C-2) for securing the tine in the roller assembly. These holes can also be cast as locating pins (A) integral to the tine base. The other feature which is significant in the tine base is the inner radius (C-3) which conforms to the radius of the outside diameter of the central driving hub (FIG. 17(B-3)).

The identifying symbol (B-1 and B-2) located on the tine boss (D) which, forms the base of the tillage tine blade, indicates by the direction of the crossbar (E) the preferred operational positioning of the roller assembly in the machine frame for the tine. The arrow (F) depicts the tine direction when viewed from the rear of the machine. The tine when assembled on a swingarm which is offset clockwise to the direction of machine travel will produce a clockwise (CW) helical tine pattern. Conversely, the installation of tines with the crossbar (E) in relation the arrow (F) on the tine boss (D) will produce a counterclockwise (CCW) helical tine pattern.

Rotary Harrow Attachment: FIG. 19

Rotary harrow (FIG. 19) technology has had serious limitations with respect to being able to perform secondary tillage operations. Typically the best and most often used application has been in extremely wet soil conditions in the springtime where it has been used to lift plant residue from the soil surface to permit air movement sufficient to dry the soil surface in preparation for planting. The harrow by Phillips (FIG. 19 (A)) because of its unique construction is able to perform total soil surface disturbance. It must, however, be able to consistently penetrate the soil surface to depths greater than ½ to ¾ of an inch (1 to 2 cm) of it is to be effective in secondary tillage.

The operation of the tandem roller configured primary tillage described herein, is capable of providing the reduction in soil density necessary to permit the rotary harrow to enter the soil profile as much as three inches (or 10 cm) in a single pass at normal soil tillage moistures. This is achieved by not lifting soil from the plow layer to the surface to be stirred or manipulated by the harrow tooling. Instead the harrow tooling enters the soil profile.

The result of this combined operation is to remove shallow rooted weeds without the use herbicides. By adjusting the amount of soil fracturing performed by the soil aerator tines it is possible to perform full-width cultivation of growing row-crops such as corn and grain sorghum at shallow depths without uprooting the young growing crop and yet remove growing and newly germinated weed seeds. This combination of technologies has the unique ability of removing weeds from within the row by safely operating between individual cultivated plants. Alfalfa experiences similar benefits from cultivation after first-cutting removal and again at the end of the harvest season, during the winter or early in the following crop year. This combination of tillage technologies reduces the need for herbicides.

This combination of tillage is used to support organic production systems where mechanical means are used exclusively to control all vegetation. At the most aggressive adjustments established growing plants are uprooted. At the least destructive adjustments weeds can be removed from growing crops at an early stage of growth without damage to the cultivated crop.

The combined action of the vertical tillage tine and rotary harrow (A) is also very effective at removing shallow depressions in fields caused by loaded wheeled vehicles such as combines, grain carts and trucks. A significant advantage is that the leveling action is most effective in the direction of travel in which the depressions were created. It is not necessary to abuse operator or machinery by crossing these depressions diagonally.

The rotary harrow is attached using a parallel linkage system (D) which is actuated mechanically, electrically or hydraulically (C). The actuator is attached either to supporting framework or on the adjusting plate with a mounting lug (I). The degree of aggressiveness of the harrow tooling is determined by the depth of operation (which is produced as a result of the primary tillage fractures created from the tillage tines) and the angle of offset adjustment at the mounting plates (E). The harrow module mounting frame (J) is pivoted uniquely in the adjusting bracket (B) at a point (F) which is located at the center of the tillage action of the harrow tooling. This arrangement hereby discloses a harrow module which stays centered in the tillage pathway regardless of the angle of rotary harrow offset. The T-framework (J) which retains the harrow is adjustable in 5 degree increments in this particular embodiment using a retaining pin (H).

The limiter pins (G) set the maximum offset angle and hold the assembly mounting plates (E) together. Each harrow module is suspended from the T-frame on a bracketed type hinge from a pin (K). An additional pin (L) is optionally installed in the bracket and a slot (M) which limits the downward travel of the harrow framing to 45 degrees. The slot allows the harrow to rise over obstacles but not lower.

When the harrow is locked in this position, the lifting force applied through the parallel linkage system can control the depth of penetration of the harrow tooling. Using adjustments for machine wheel spacing and height controls on the machine mainframe and the harrow framing, this unit can used to selectively recondition permanent raised beds and ridges.

The aerator tine operation causes capillary water to rise vertically along the thrust face of the perforation, so the use of the tine can in certain circumstances aggravates soil moisture loss to the soil surface and keep soils to wet for satisfactory planter seed opener operation. The addition of the rotary harrow to the cultivation sequence stops the upward movement of the capillary water at the depth of harrow tooling horizontal arcuate travel in the soil profile. It is practical to adjust the aerator tine fracture forces to effectively adjust the operating depth of the rotary harrow tooling so that the seed trench is placed in the soil profile right at the point where capillary water concentrates at the bottom of the harrow tooling horizontal pathway.

Harrows which are operated at or near zero degrees of offset will assure travel of capillary water to the surface of the field. This is very advantageous when establishing a new crop in a dry soil condition where the seed is placed. Similarly, soil applied herbicides which need water to be activated can be activated with the combination of the tillage tine action and the gentle tamping effect of the harrow tooling at zero degrees of offset.

Residue Resizing, Crimping: FIG. 20

Tillage operations afford an opportunity to perform auxiliary field operations such as crop residue resizing or chopping and crimping of growing crops. If the amount of soil disturbance desired is minimal then choppers (FIG. 20) would be embodied as a front mounted attachment as in FIG. 20. The knife reel (A) is generally more effective at cutting residue with the blade (B) on a relatively harder untilled soil surface. In situations where the ground cover is limited and wind erosion has the potential of contributing to crop residue and soil loss, this attachment would logically be attached to the rear of the machine. This arrangement will sever fewer stalks and tend to pin or stake them into the soil instead. In this environment rotary harrows would be reserved for use at planting time to comb residue out of the seed furrow zone for improved seed opener function and protection for seedlings from wind blown soil particles.

When cover-crops are used they must be controlled in order for the new crop to emerge and come to harvest. These cover-crop plants can be controlled using chemicals or properly timed crimping. Enhancing effectiveness of this operation with the chopper type attachment is covered in FIG. 4 discussion on the over-center rock protection linkage adjustment.

By combining all three tillage and residue management technologies (FIG. 21), it is possible to combine other vital best management practices such as covercrop seeding, fertilizing, liming materials application, and applications of other soil amendments such as bio-stimulants and microbial inoculants with primary and secondary tillage operations. Mounting or trailing pneumatic and liquid application equipment with or without GIS/GPS technologies is a practical reality while performing tillage operations that can be tailored to the soil amendments or seeds being applied. All of these best management practices now become possible because of a single-pass tillage/planting/fertilizing technology which performs necessary primary tillage without destruction of the eco-system.

Lastly, FIG. 22 discloses the consummation of the all the embodiments by illustrating the inclusion of seeding and fertilizing attachments. All of the tillage and residue management (A, B and C), which has been disclosed to this point for fallow tillage or for soil preparation in advance of planting operations, leads logically to the inclusion of planting and band fertilizing operations performed simultaneously with tillage.

Creating Tillage Zones for Fertilizing and Seeding

Adjustable locations of the swingarm pivot socket (H) within the framework can be used to create tilled zones and intermediate untilled zones. Using different lengths of roller spacers (FIGS. 14 E & F) can also create zones of tillage action. These zones can be further modified by installing a strip-till knife (E) into the frame on a separate toolbar (D). This would be similar to what is achieved by using knives or large coulter systems in what has been popularized as "strip-till". The benefit of the tillage from the shank (E) is enhanced with the tillage tine action in front (A) and results in a greatly reduced rate of wear for the strip-till shanks (E). The total amount of soil zone which can be influenced by soil amendments is greatly expanded.

This strip-till attachment is compatible with twin-row planting configurations (7 to 8 inch or 17.5 to 19 cm) width double rows) of any row center line spacing is possible because of the adjustability of transport wheels and seed openers (F) along the mounting bar (D). Planting single rows between two rows of tines can be achieved on 10", 20" or 30" spacing using standard roller spacers. Additional residue cutting can be used to advantage if the operator desires to plant seed or place fertility in the vertical tine marks. The unique ability of the tine to not lift soil or seed vertically permits tillage tine action at the rear (B) following seed placement. Depth gage wheels (G) or other similar devices common to the art are employed to control seed placement depth. This gauging action of the wheel combines with the tine action to result in an improved concentration of capillary water aiding in rapid and uniform seed germination and diffusion and dilution of soluble soil amendments especially important for those that contain soluble salts that could harm the seed itself or small seedling.

Other seeds, such as cereals and small seeded legumes and grasses can be simply scattered from overhead frame-mounted seed boxes or blown over spreaders from air seeding equipment as would be common to the art. Rear rank (E) tillage is performed right through the small seeds without burying them and the rotary harrow (F) is used to incorporate to desired depth or gently tamp the soil to bring capillary water to the seed placement zone.

IN SUMMARY

This application discloses refinements to pre-existing tillage technology, unique combinations of tillage and residue management technologies embodied in a framework which optimizes the performance of each individual component and the synergistic impact of the combination of all elements. This is all accomplished while creating a total production system which moves management forward toward a sustainable and advancing biological crop production system for the new millennium.

This tillage technology reduces soil erosion, freshwater non-point pollution and the consumption of nonrenewable energy resources, while creating more natural fertility. Creating soils with a growing biosphere with greater diversity, enhances the fruit of man's labor, by producing more nutrient dense and healthier foodstuffs for mankind and the other species who inhabit Earth with us.

The invention claimed is:

1. A machine for tillage of soil fields, said tillage machine comprising:
   a frame adapted to travel in a direction of travel;
   a plurality of front tines rotatably secured to said frame;
   a plurality of rear tines rotatably secured to said frame,
   said front tines being located in front of said rear tines along said direction of travel; and,
   said front tines being aligned with said rear tines along said direction of travel whereby said front tines penetrate the soil and create tine soil penetrations and said rear tines enter the soil in the same penetrations which are created by said front tines.

2. The tillage machine of claim 1 wherein said plurality of front tines are rotatably secured to said frame in one of a clockwise or counter-clockwise angle about a front pivot point relative to said direction of travel and said rear tines are rotatably secured to said frame in one of a clockwise or counter-clockwise angle about a rear pivot point relative to said direction of travel and opposite said front tines angle, whereby said front tines penetrate and fracture the soil in one direction and said rear tines enter the soil penetrations created by the front tines and fracture the soil in another direction.

3. The tillage machine of claim 2 wherein each of said tines includes a concave arcuate shaped entry edge terminating at a tine tip, whereby said tine tip first enters the soil when penetrating or entering the soil.

4. The tillage machine of claim 3 wherein each of said tines include a convex arcuate shaped trailing edge.

5. The tillage machine of claim 3 wherein said frame includes a front end adapted to be connected to and pulled by a tractor and further comprising a plurality of supporting wheels rotatably secured to and selectively supporting said frame.

6. The tillage machine of claim 3 wherein each of said front and rear plurality of tines are laterally arranged in groups, each group of tines comprising three tines spaced radially 120° from each other, and wherein the tines of each laterally spaced group are spaced radially 40° degrees from the tines of the laterally adjacent group.

7. The tillage machine of claim 2 wherein each of said front and rear plurality of tines are laterally arranged in groups, each group of tines comprising three tines spaced radially 120° from each other, and wherein the tines of each laterally spaced group are spaced radially 40° degrees from the tines of the laterally adjacent group.

8. The tillage machine of claim 1 wherein:
a plurality of said front tines are rotatably secured to said frame in one of a clockwise or counter-clockwise angle about a front left pivot point relative to said direction of travel and defining front left tines;
a plurality of said front tines are rotatably secured to said frame in one of a clockwise or counter-clockwise angle about a front right pivot point relative to said direction of travel and defining front right tines;
a plurality of said rear tines are rotatably secured to said frame in one of a clockwise or counter-clockwise angle about a rear left pivot point relative to said direction of travel and defining rear left tines;
a plurality of said rear tines are rotatably secured to said frame in one of a clockwise or counter-clockwise angle about a rear right pivot point relative to said direction of travel and defining rear right tines; and,
said front left tines angle being substantially the same as said rear right tines angle, said front right tines angle being substantially the same as said rear left tines angle and said front left and rear left angles are opposite said respective front right and rear right angles relative to said direction of travel, whereby said front tines penetrate and fracture the soil in one direction and said rear tines enter the soil penetrations created by the front tines and fracture the soil in another direction.

9. The tillage machine of claim 8 wherein each of said tines includes a concave arcuate shaped entry edge terminating at a tine tip, whereby said tine tip first enters the soil when penetrating or entering the soil.

10. The tillage machine of claim 9 wherein each of said tines include a convex arcuate shaped trailing edge.

11. The tillage machine of claim 9 wherein said frame includes a front end adapted to be connected to and pulled by a tractor and further comprising a plurality of supporting wheels rotatably secured to and selectively supporting said frame.

12. The tillage machine of claim 9 wherein each of said front and rear plurality of tines are laterally arranged in groups, each group of tines comprising three tines spaced radially 120° from each other, and wherein the tines of each laterally spaced group are spaced radially 40° degrees from the tines of the laterally adjacent group.

13. The tillage machine of claim 8 wherein each of said front and rear plurality of tines are laterally arranged in groups, each group of tines comprising three tines spaced radially 120° from each other, and wherein the tines of each laterally spaced group are spaced radially 40° degrees from the tines of the laterally adjacent group.

14. The tillage machine of claim 1 wherein each of said tines includes a concave arcuate shaped entry edge terminating at a tine tip, whereby said tine tip first enters the soil when penetrating or entering the soil.

15. The tillage machine of claim 14 wherein each of said tines include a convex arcuate shaped trailing edge.

16. The tillage machine of claim 1 wherein said frame includes a front end adapted to be connected to and pulled by a tractor and further comprising a plurality of supporting wheels rotatably secured to and selectively supporting said frame.

17. The tillage machine of claim 1 wherein each of said front and rear plurality of tines are laterally arranged in groups, each group of tines comprising three tines spaced radially 120° from each other, and wherein the tines of each laterally spaced group are spaced radially 40° degrees from the tines of the laterally adjacent group.

18. The tillage machine of claim 1 wherein said front tines are secured on a front roller assembly which is pivotally secured to said frame about a front pivot point generally perpendicular to said direction of travel and said rear tines are secured on a rear roller assembly which is pivotally secured to said frame about a rear pivot point generally perpendicular to said direction of travel.

19. The tillage machine of claim 18 wherein said front roller assembly is secured to a front swing arm, said front swing arm being pivotally secured to said frame about said front pivot point, and wherein said rear roller assembly is secured to a rear swing arm, said rear swing arm being pivotally secured to said frame about said rear pivot point.

20. The tillage machine of claim 19 wherein said front and rear roller assemblies are secured to their respective front and rear swing arms with flexible brackets.

21. The tillage machine of claim 19 wherein each said roller assembly comprises a plurality of groups of tines, each tine group spaced laterally along its roller assembly, and wherein each said group of tines comprises three tines spaced 120° from each other around the roller assembly, and wherein the tines of each group spaced laterally along its roller assembly are spaced 40° degrees from the tines of the laterally adjacent group.

22. The tillage machine of claim 19 further comprising a linkage between said front swing arm and said rear swing arm whereby a pivot angle of said front swing arm and said rear swing arm are maintained relative to said direction of travel.

23. The tillage machine of claim 18 wherein said frame includes a front end adapted to be connected to and pulled by a tractor and further comprising a plurality of supporting wheels rotatably secured to and selectively supporting said frame.

24. The tillage machine of claim 18 wherein each said roller assembly comprises a plurality of groups of tines, each tine group spaced laterally along its roller assembly, and wherein each said group of tines comprises three tines spaced 120° from each other around the roller assembly, and wherein the tines of each group spaced laterally along its roller assembly are spaced 40° degrees from the tines of the laterally adjacent group.

25. The tillage machine of claim 18 wherein said front roller assembly and said rear roller assembly are both detachably attachable to said frame and interchangeable with each other, whereby higher wearing front tines may be exchanged with lower wearing rear tines by exchanging said front and rear roller assemblies.

26. The tillage machine of claim 1 wherein:
a plurality of said front tines are secured on a front left roller assembly which is pivotally secured to said frame about a front left pivot point generally perpendicular to said direction of travel;
a plurality of said front tines are secured on a front right roller assembly which is pivotally secured to said frame about a front right pivot point generally perpendicular to said direction of travel;

a plurality of said rear tines are secured on a rear left roller assembly which is pivotally secured to said frame about a rear left pivot point generally perpendicular to said direction of travel; and, a plurality of said rear tines are secured on a rear right roller assembly which is pivotally secured to said frame about a rear right pivot point generally perpendicular to said direction of travel.

27. The tillage machine of claim 26 wherein:

said front left roller assembly is secured to a front left swing arm, said front left swing arm being pivotally secured to said frame about said front left pivot point;

said front right roller assembly is secured to a front right swing arm, said front right swing arm being pivotally secured to said frame about said front right pivot point;

said rear left roller assembly is secured to a rear left swing arm, said rear left swing arm being pivotally secured to said frame about said rear left pivot point; and, said rear right roller assembly is secured to a rear right swing arm, said rear right swing arm being pivotally secured to said frame about said rear right pivot point.

28. The tillage machine of claim 27 wherein said front and rear roller assemblies are secured to their respective front and rear swing arms with flexible brackets.

29. The tillage machine of claim 27 wherein each said roller assembly comprises a plurality of groups of tines, each tine group spaced laterally along its roller assembly, and wherein each said group of tines comprises three tines spaced 120° from each other around the roller assembly, and wherein the tines of each group spaced laterally along its roller assembly are spaced 40° degrees from the tines of the laterally adjacent group.

30. The tillage machine of claim 27 further comprising a left linkage between said front left swing arm and said rear left swing arm whereby a pivot angle of said front left swing arm and said rear left swing arm are maintained relative to said direction of travel, and a right linkage between said front right swing arm and said rear right swing arm, whereby a pivot angle of said front right swing arm and said rear right swing arm are maintained relative to said direction of travel.

31. The tillage machine of claim 26 wherein said frame includes a front end adapted to be connected to and pulled by a tractor and further comprising a plurality of supporting wheels rotatably secured to and selectively supporting said frame.

32. The tillage machine of claim 26 wherein each said roller assembly comprises a plurality of groups of tines, each tine group spaced laterally along its roller assembly, and wherein each said group of tines comprises three tines spaced 120° from each other around the roller assembly, and wherein the tines of each group spaced laterally along its roller assembly are spaced 40° degrees from the tines of the laterally adjacent group.

33. The tillage machine of claim 26 wherein each of said roller assemblies are detachably attachable to said frame, and wherein said front left roller assembly is interchangeable with said rear left roller assembly and said front right roller assembly is interchangeable with said rear right roller assembly, whereby higher wearing front tines may be exchanged with lower wearing rear tines by exchanging said front and rear roller assemblies.

34. The tillage machine of claim 26 wherein said roller assemblies are pivotable forming double offset configuration.

35. The tillage machine of claim 26 wherein said roller assemblies are pivotable forming diamond offset configuration.

36. The tillage machine of claim 16 wherein said wheels are each rotatably secured to a wheel lever assembly, said wheel lever assemblies being pivotally secured to said frame whereby said wheels are selectively pivotable for supporting said frame.

37. The tillage machine of claim 36 wherein each said wheel lever assembly is selectively moveably generally perpendicular to said direction of travel whereby a wheel spacing distance between said wheels is selectively adjustable.

38. The tillage machine of claim 1 wherein said front tines are secured on a front roller assembly and said rear tines are secured on a rear roller assembly, and wherein one of said front or rear roller assembly extends at clockwise angle about a pivot point and relative to said direction of travel and said other of said front or rear roller assemblies extends at a counter-clockwise angle about another pivot point and relative to said direction of travel, whereby said front tines penetrate and fracture the soil in one direction and said rear tines enter the soil penetrations created by the front tines and fracture the soil in another direction.

39. The tillage machine of claim 1 further comprising a rotary harrow secured to said frame behind said plurality of rear tines relative to said direction of travel.

40. The tillage machine of claim 39 wherein said rotary harrow is selectively pivotable about a pivot point and moveable in and out of engagement with the soil.

\* \* \* \* \*